United States Patent [19]
Yoshida

[11] Patent Number: 5,127,013
[45] Date of Patent: Jun. 30, 1992

[54] DATA COMMUNICATION SYSTEM

[75] Inventor: Takehiro Yoshida, Tokyo, Japan

[73] Assignee: Canon Kabushiki Kaisha, Tokyo, Japan

[21] Appl. No.: 817,967

[22] Filed: Jan. 8, 1992

Related U.S. Application Data

[63] Continuation of Ser. No. 742,168, Aug. 1, 1991, abandoned, which is a continuation of Ser. No. 371,847, Jun. 27, 1989, abandoned.

[30] Foreign Application Priority Data

Jul. 1, 1988 [JP] Japan ............... 63-165652
Jul. 1, 1988 [JP] Japan ............... 63-165653
Jul. 1, 1988 [JP] Japan ............... 63-165654

[51] Int. Cl.⁵ .......................... G06F 11/00
[52] U.S. Cl. ..................... 371/32; 358/404; 358/405
[58] Field of Search ............ 371/32, 33, 37.1, 37.2, 371/40.1, 38.1, 39.1, 41, 5.5, 20.1, 66; 358/404, 405, 434, 437, 438, 444, 441, 296; 455/63, 68, 69, 7, 8; 375/58; 379/1; 370/94.1

[56] References Cited

U.S. PATENT DOCUMENTS

| | | | |
|---|---|---|---|
| 3,426,323 | 2/1969 | Shimabukuro | 371/32 |
| 3,452,330 | 6/1969 | Avery | 371/32 |
| 3,456,239 | 7/1969 | Glasson | 371/32 |
| 3,506,961 | 4/1970 | Abromson | 371/41 |
| 3,593,281 | 5/1971 | Wassenaar | 371/32 |
| 3,824,547 | 7/1974 | Green | 371/32 |
| 3,879,577 | 4/1975 | Progler | 371/32 X |
| 4,584,685 | 4/1986 | Gajjar | 371/32 X |
| 4,622,682 | 11/1986 | Kumakura | 371/32 X |
| 4,827,349 | 5/1989 | Ogata | 358/434 |
| 4,887,162 | 12/1989 | Arai | 358/434 X |
| 4,908,828 | 3/1990 | Tikalsky | 371/32 X |

Primary Examiner—Robert W. Beausoliel
Attorney, Agent, or Firm—Fitzpatrick, Cella, Harper & Scinto

[57] ABSTRACT

A data communication system, capable of operating in an error correction mode, is capable of producing, when data received in an error correction mode could not be correctly recorded, information indicative of the occurrence of such a recording failure. When an error exists in data received in the error correction mode, a message is recorded subsequent to the recording of the received data to announce the presence of the error, thus facilitating recognition of the occurrence of error.

15 Claims, 18 Drawing Sheets

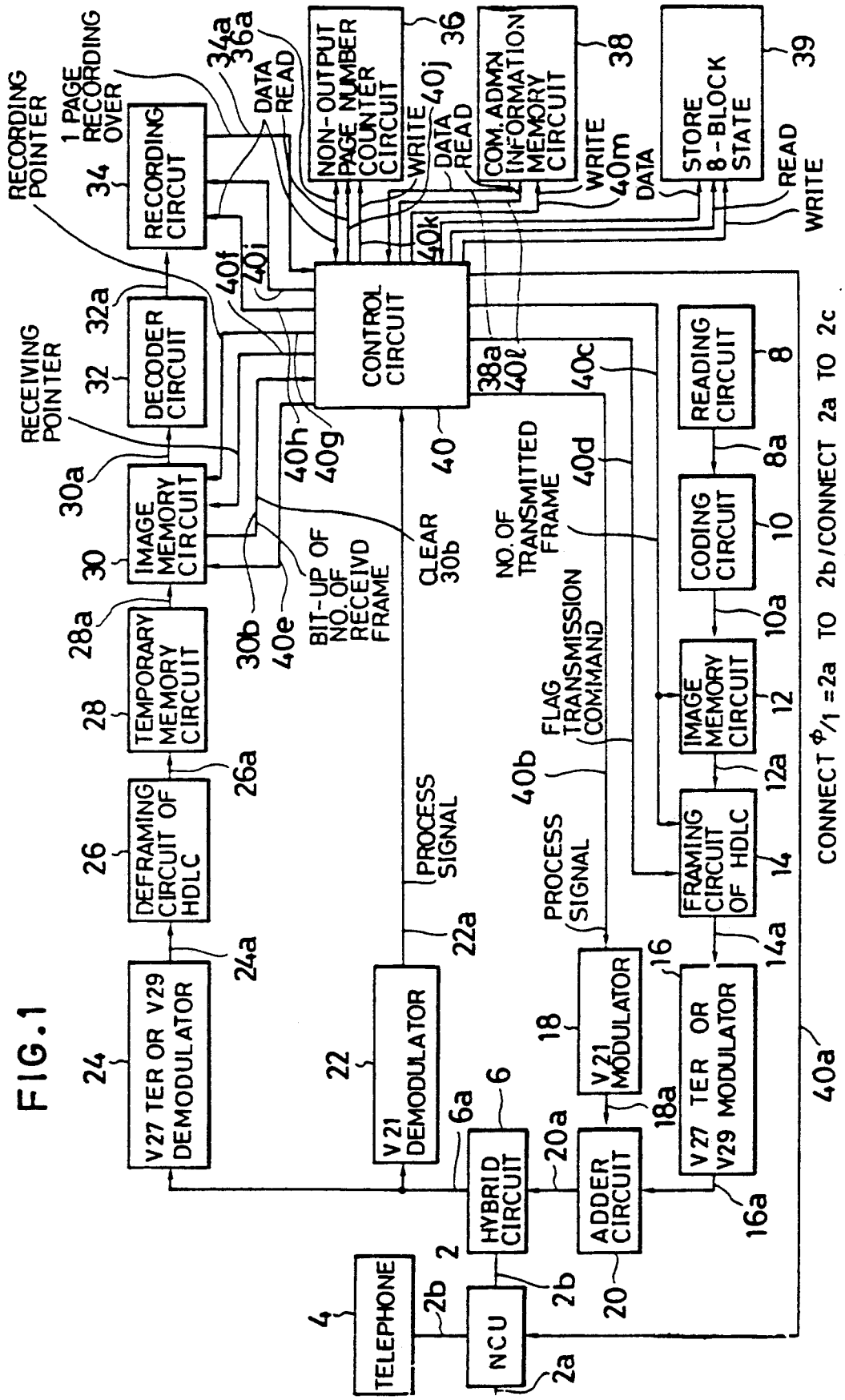

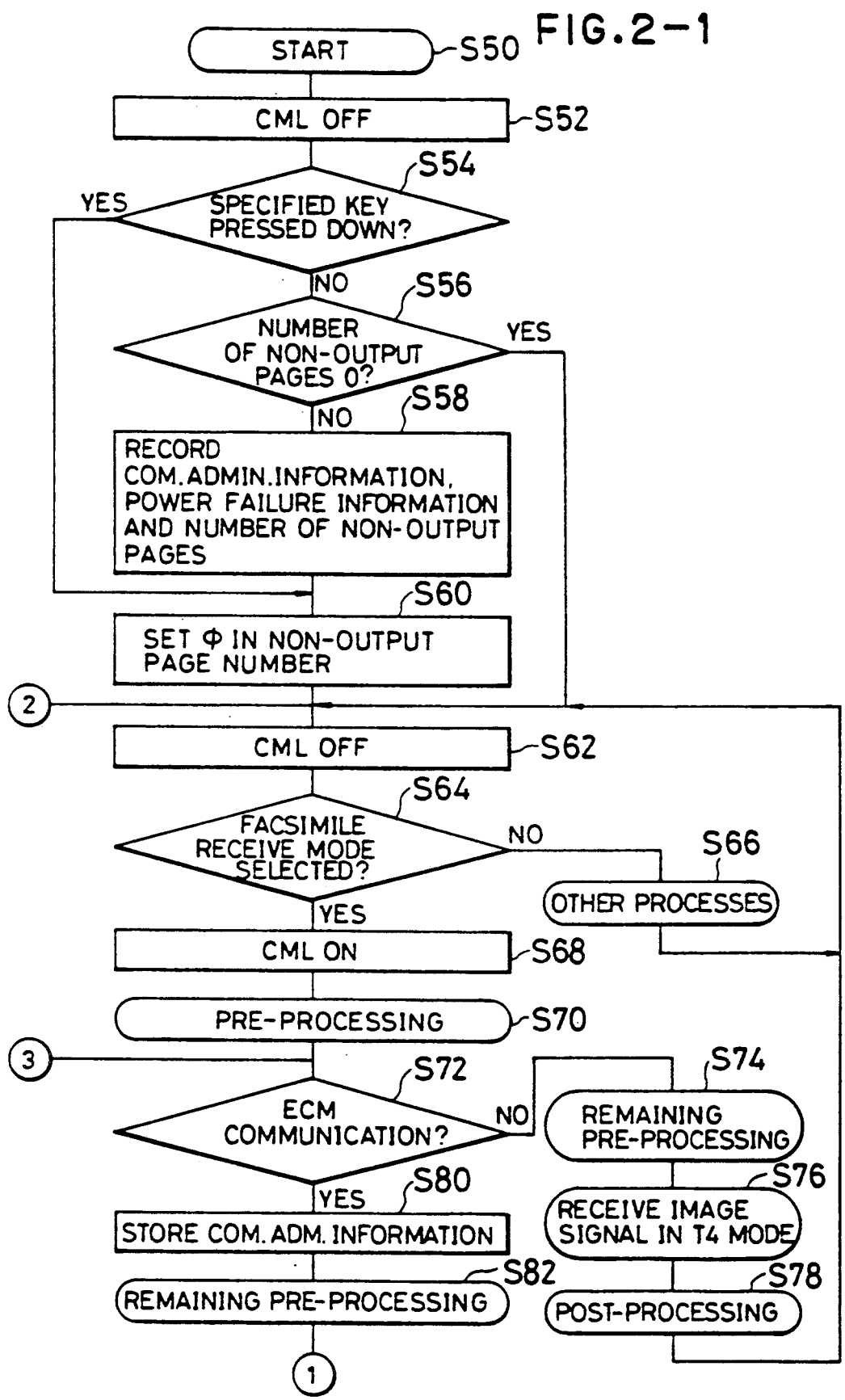

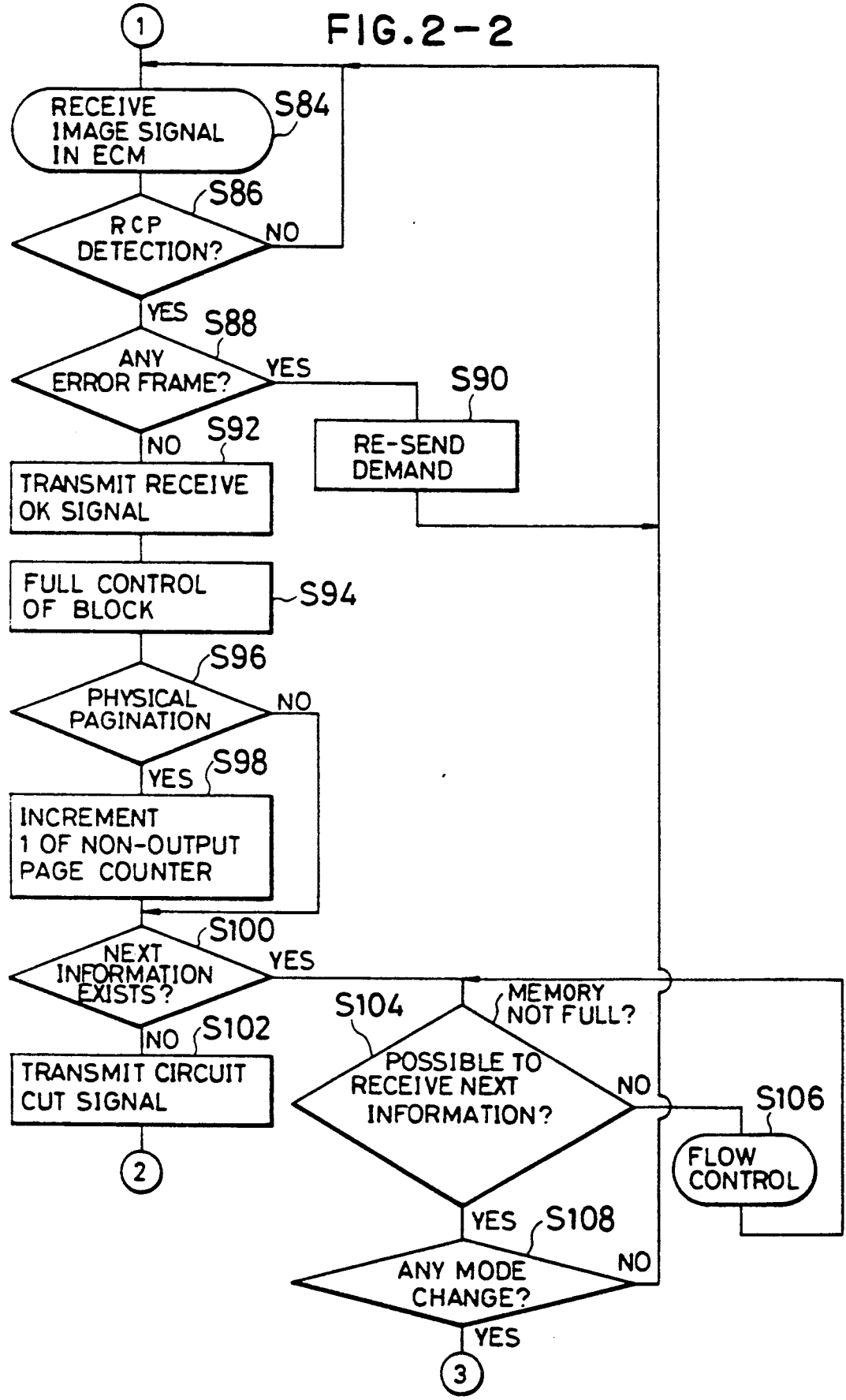

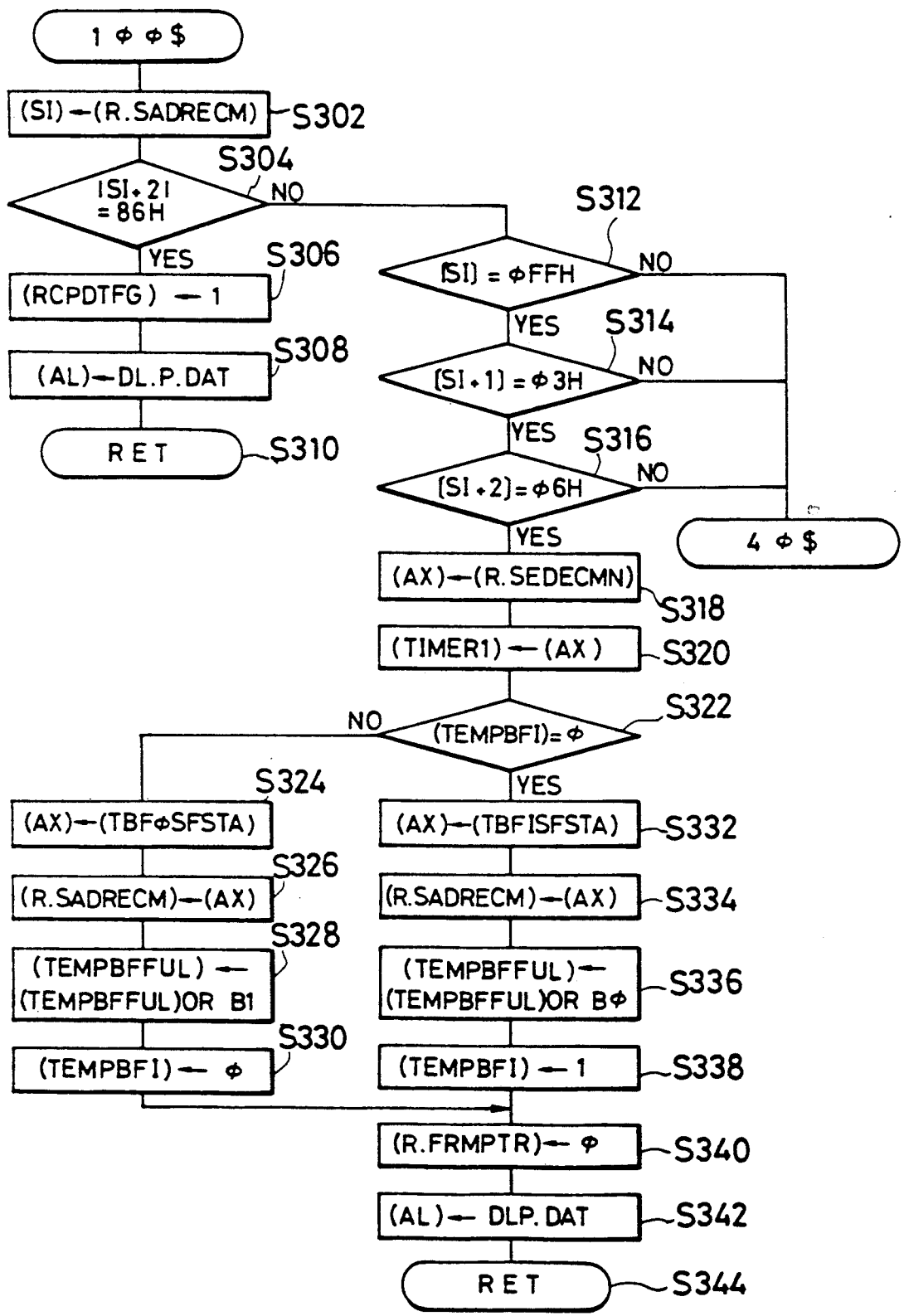

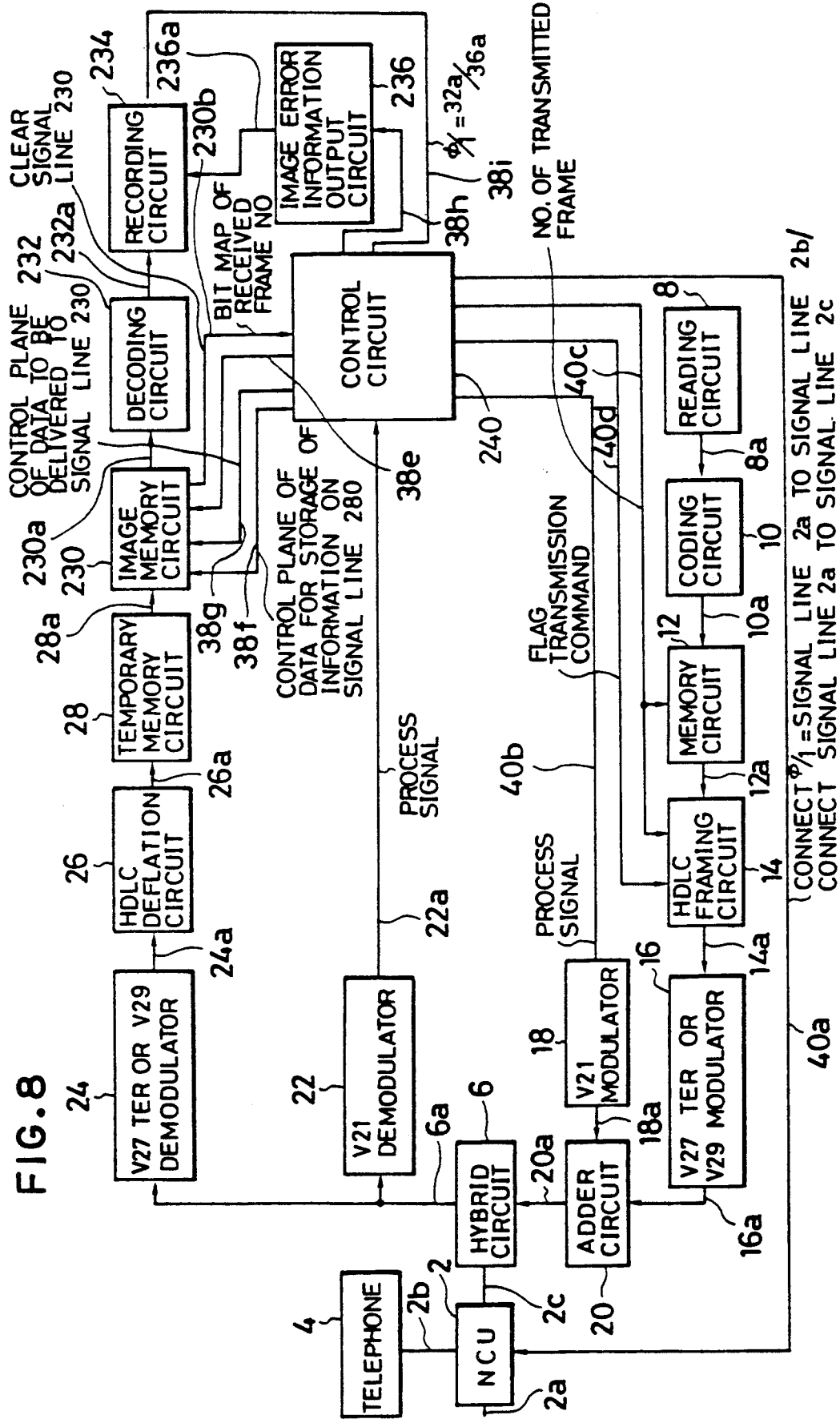

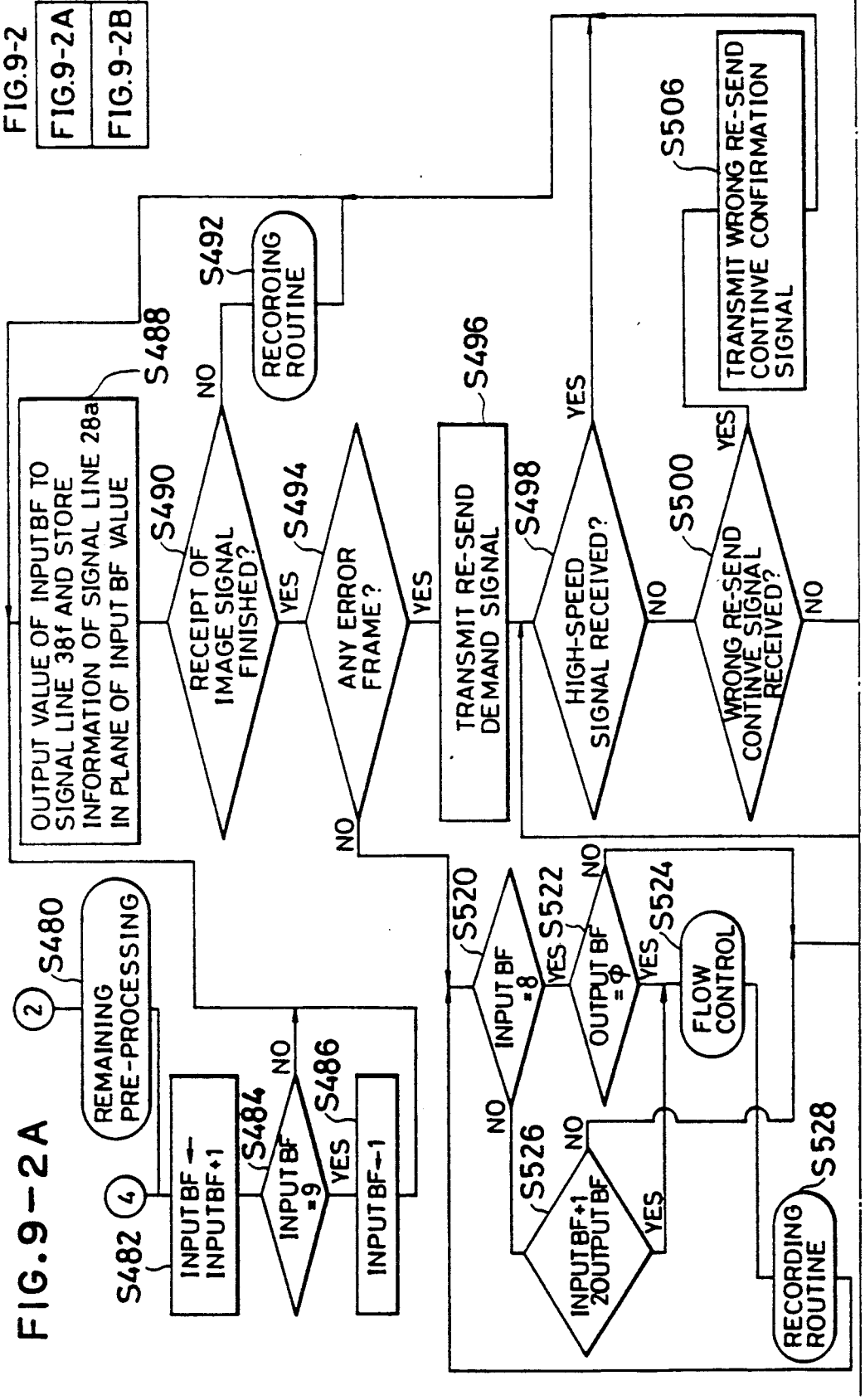

DATA COMMUNICATION SYSTEM

This application is a continuation of application Ser. No. 07/742,168 filed Aug. 1, 1991, abandoned, which was a continuation of application Ser. No. 07/371,847 filed on Jun. 27, 1989 now abandoned.

BACKGROUND OF THE INVENTION

1. Field of the Invention

The present invention relates to a data communication system and, more particularly, to a data communication system having an error correcting function.

2. Description of the Related Art

Data communication systems such as facsimiles have been known in which received image data is recorded in real time and, upon safe receipt of one page of image data, a message acknowledgment signal indicative of the safe receipt of the data is issued.

Apparatus are also known in which the received data is first stored in a memory and then recorded and a message acknowledgment signal is produced when storage of one page of image data is finished. In this type of apparatus, the message acknowledgment signal is issued before the recording of the received image data.

The apparatus of the second-mentioned type is therefore disadvantageous in that the message acknowledgment signal is wrongly sent to the transmitting or sending side even when the recording is not actually conducted due to, for example, a power failure which has taken place after the receipt and storage of the image data. In consequence, the sending apparatus may wrongly understand that the recording at the receiving side has been safely completed. Thus, the image data may be lost if the operator of the receiving side is not aware of the recording failure.

Known facsimile apparatus also suffers from a problem in that, when a training receipt of a high-speed signal (image signal) fails during communication in G3 mode, the communication is undesirably suspended. If the training receipt of the high-speed (image) signal is completed successfully, the facsimile apparatus starts to receive the image data. If an RTC (Return to Control) signal could not be received during receiving of the data due to, for example, a disturbance of the data, the facsimile apparatus undesirably remains in the mode for receiving high-speed signal. In such a case, triple transmission of Q (MPS or EOM or EOP) is finished while a decoding circuit is seeking for the RTC, with the result that further transmission becomes impossible.

Known facsimile apparatus having an error correction function has encountered a problem in that an error frame often remains even when error frames have been sent repeatedly after selection of the error correction mode at the receiving side. In such a case, an error is undesirably caused in the recorded image although the error correction mode has been selected. This is quite inconvenient considering that the operator at the receiving side, who has selected the error correction mode, is convinced of safe receipt of data without error.

In order to overcome this problem, the present applicant has proposed, in the U.S. patent application Ser. No. 267,541, a data communication system in which the recording of an error frame is neglected or replaced with a unique code, in the event that such an error frame remains. This apparatus, however, cannot enable an operator to check whether any error frame exists in the received data by an at-a-glance check.

When data on a long continuous sheet is sent while the facsimile apparatus of the receiving side is of the type which records received data on cut sheets, one physical page transmitted from the sending apparatus is recorded in a plurality of, e.g., three, physical pages at the receiving side. If an uncorrectable frame exists in the first physical page, the data of this frame is neglected or replaced with a unique code, with the result that the positions of recording on the second and third physical pages are undesirably shifted from the positions where the data is to be recorded when there is no error frame. In addition, when cut-sheet type apparatus is used at the receiving side, the operator at the receiving side is often confused because there is no means for determining whether the received data is a part of data on a continuous long material or whether one physical page at the receiving side corresponds to one physical page transmitted from the sending side. Thus, the operator may erroneously understand that the data recorded on the above-mentioned second and third pages have been received correctly, without being aware of the omission of the error frame.

Although data communication systems having an error correction mode have been proposed in U.S. patent application Ser. Nos. 110,542, 847,684 and 162,266, none of such applications proposes a measure for overcoming the above-described problems.

SUMMARY OF THE INVENTION

Accordingly, an object of the present invention is to provide an improved data communication system capable of overcoming the above-described problems of the prior art.

Another object of the present invention is to provide a data communication system which enables an operator to easily recognize the presence of any data error in the data received in an error correction mode operation of the system.

Still another object of the present invention is to provide a data communication system which enables, when an error is caused in the course of recording of data after sending a message acknowledgment signal back to the transmission side, an operator to recognize the occurrence of such an error.

A further object of the present invention is to provide a data communication system which can eliminate any erroneous termination of communication attributable to the occurrence of a retraining error.

A still further object of the present invention is to provide a data communication system which can inform an operator of an error in which the data received and recorded at the receiving side does not correctly correspond to the data on a physical page of the material transmitted from the sending side.

Other objects, features and advantages of the present invention will become clear from the following description of the preferred embodiments when the same is read in conjunction with the accompanying drawings.

BRIEF DESCRIPTION OF THE DRAWINGS

FIG. 1 is a block diagram of a facsimile apparatus which is a first embodiment of the present invention;

FIGS. 2-1 and 2-2 are portions of a flow chart illustrative of the control operation of a control circuit 40 incorporated in the first embodiment;

FIGS. 7(A)-1 to 7(A)-3 and 7(B)-1 and 7(B)-2 are flow charts illustrative of the operation of a control circuit 140 incorporated in the second embodiment;

FIG. 8 is a block diagram of a facsimile apparatus as a third embodiment;

FIGS. 9-1 to 9-2B are portions of a flow chart illustrative of a control operation performed by a control circuit 240 incorporated in the third embodiment;

DESCRIPTION OF THE PREFERRED EMBODIMENTS

Facsimile apparatus as preferred embodiments of the invention will be described by way of example.

A first embodiment of the communication system of the present invention is improved to inform an operator of the fact that image data once stored in a memory of the receiving apparatus has been lost for any reason before recording after sending an acknowledgement signal back to the sending side.

The facsimile apparatus as the first embodiment has a memory with a back-up (referred to as "back-up memory") which is used for the purpose of administration of communication administration data such as the number of pages of image data stored in an image memory which does not have any back-up, information concerning the sending station, and so forth. The back-up memory also administers the number of pages of image data remaining in the image memory, and a controller determines and confirms completion of recording upon detection of the number of the pages remaining in the image memory being reduced to 0 (zero). In the event that the recording operation is accidentally suspended due to, for example, a power failure, the controller checks the back-up memory after recovery of the power to examine whether the page number stored in the back-up memory is "0". If the number stored in the back-up memory is not "0", i.e., when some of the images initially stored in the image memory have not been recorded yet, the communication administration information in the back-up memory, as well as information indicating that the images in the image memory have not been recorded due to, for example, a power failure, are printed out on the record paper together with the information concerning the number of pages which could not be recorded. Then, the controller clears the content of the back-up memory.

The facsimile apparatus of the first embodiment has a memory space having eight blocks each of which is 64 Kbytes. Therefore, if the image data contained in one page (A-4 size) corresponds to one block, it is possible to store images of eight pages. This capacity of the image memory, however, is only illustrative and images of a greater number can be stored if the number of the blocks is increased. The maximum value of the number of pages which could not be recorded, therefore, is determined by the capacity of the image memory.

In operation, the number set in the back-up memory indicative of the number of pages stored in the image memory is decremented by one each time the data of one page is output from the image data, i.e., each time image data of one page is recorded, and is incremented by one each time image data of a new page is stored in the image memory.

The first embodiment will be described in detail hereinafter with reference to the drawings.

Figures 1, 7A:
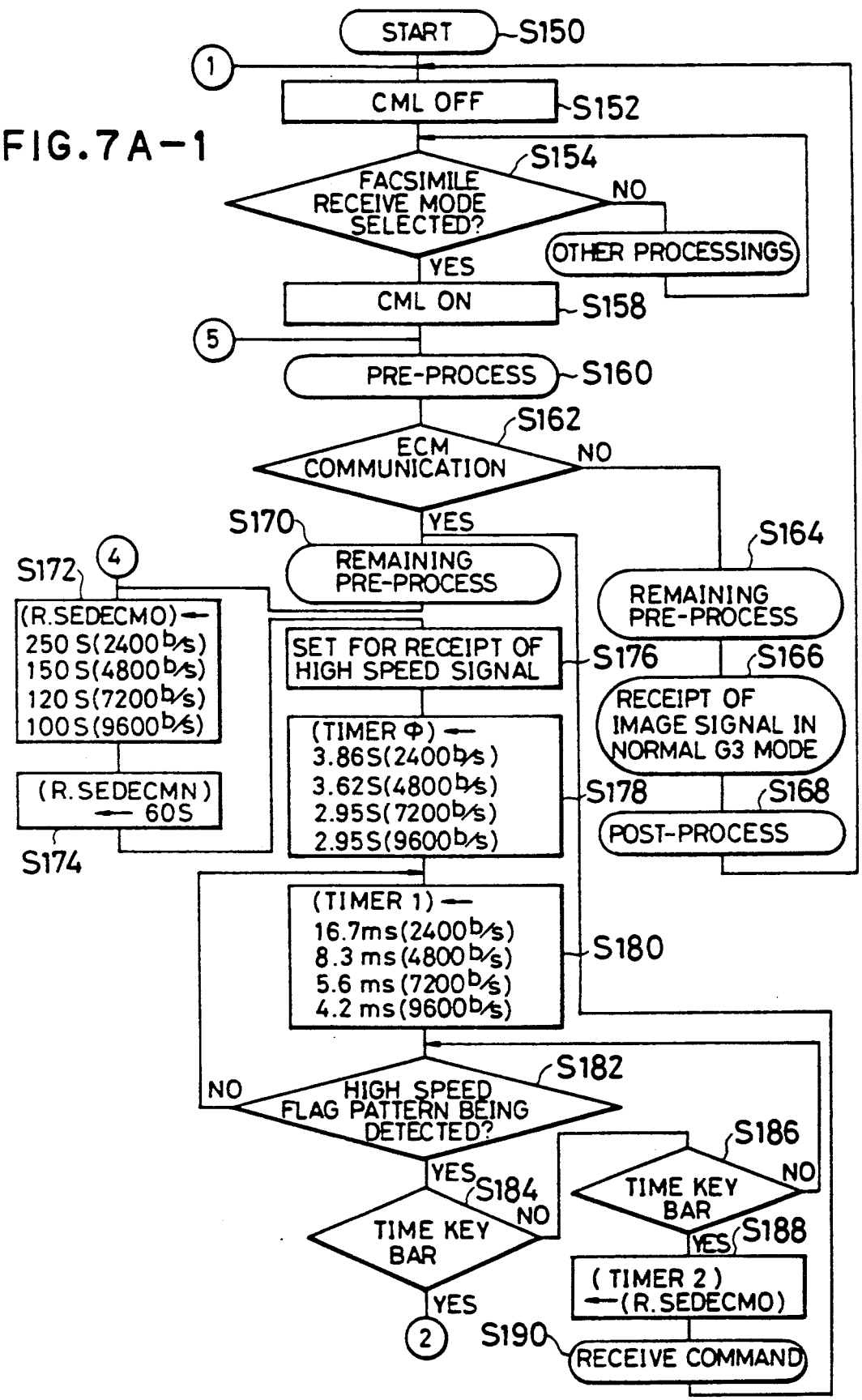

Referring to FIG. 1 showing a facsimile apparatus as the first embodiment of the present invention, an NCU (Network Control Unit) denoted by 2 is connected to a telephone circuit so as to enable a telephone network to be used as the data communication line. Thus, the NCU 2 performs various functions such as control of connection of the telephone network, changing over to the data communication line and holding of the loop. A telephone circuit line as a signal transmission line is denoted by 2a. The NCU 2 receives a signal from a signal line 40a and, if the level of this signal is "0", connects the signal line 2a to a telephone 4, i.e., to a signal line 2b. Conversely, if the level of the received signal is "1", the NCU 2 operates to connect the telephone circuit to the facsimile apparatus, i.e., connects the signal line 2a to a signal line 2c. Usually, the telephone circuit 2a is connected to the signal line 2b of the telephone.

A numeral 6 denotes a hybrid circuit for separating signals from the transmission side and signals from the receiving side from each other. Namely, signals to be transmitted from a signal line 20a are sent to the telephone circuit through the signal line 2c via the NCU 2. On the other hand, signals sent from an opposite station are received through the NCU 2 and are delivered to the signal line 6a through the signal line 2c.

Numeral 8 denotes a reading circuit which reads image data along successive main scan lines and forms a signal train having binary-coded signals representing white and black. The reading circuit 8 is composed of an imaging device such as a CCD (charge-coupled device) and an optical system. The binary-coded signal train is output to the signal line 8a.

Numeral 10 denotes a circuit which receives read data available on the signal line 8a and encodes the data in accordance with MH (Modified Huffman) coding method or MR (Modified Read) coding method.

A memory circuit 12 is capable of storing data output to a signal line 10a. The facsimile apparatus of this embodiment is capable of transmitting a plurality of frames at a time as one block and, if error has been caused in one or more frames, such frame or frames are transmitted again. The memory circuit 12, therefore, is required to have a capacity corresponding to one block at the smallest. In the illustrated embodiment, a later-mentioned image memory 30 having a capacity of eight blocks is used also as the image memory 12. Thus, the image memory 12 has a capacity of eight blocks. Description is omitted in regard to the storage of the coded data in the eight-block image memory and the output of the coded data from the image memory. When the number of the frame to be transmitted is output to the signal line 40, the image memory circuit 12 delivers the information of this frame to a signal line 12a.

Numeral 14 denotes a circuit for adding, to the beginning end of the coded data delivered to the signal line 12a, an address field, a control field, an FCF field and an FIF field (this contains the number of the frame presently transmitted), formatting the thus formed information in accordance with HDLC format, and delivering the HDLC information to a signal line 14a. The framing circuit 14 of the HDLC also delivers to the signal line 14a a flag for controlling the flow of operation of the sending side apparatus, when a signal of "1" level is available on the signal line 14a.

Numeral 16 denotes a modulator for conducting modulation in accordance with differential phase modulation V27ter recommended by CCITT or orthogonal modulation V29. The modulator 16 receives a signal from the signal line 14a and, after modulation of the received signal, delivers the modulated signal to a signal line 16a.

Numeral 18 denotes a modulator for effecting modulation in accordance with V21 recommended by CCITT. The modulator 18 receives a facsimile communication process signal from a signal line 40b, modulates the received signal and then delivers the modulated signal to a signal line 18a.

An adder 20 is capable of receiving signals from the signal line 16a and the signal line 18a and delivers the result of addition of these signals to the signal line 20a.

A demodulator 22 is capable of performing demodulation in accordance with V21 demodulation recommended by CCITT. The demodulator 22 receives the signal on the signal line 6a (facsimile communication process signal), executes V21 demodulation and delivers the demodulated signal to the signal line 22a.

Numeral 24 denotes a demodulator for conducting demodulation in accordance with differential phase modulation V27ter recommended by CCITT or orthogonal modulation V29. The demodulator 24 receives a signal from the signal line 6a (image signal) and, after modulation of the received signal, delivers the modulated signal to a signal line 24a.

An HDLC deframing circuit 26 receives the demodulated data output to the signal line 24a and conducts a "0" delete of the HDLC data so as to recover the data before the HDLC formatting. The thus recovered data is delivered to a signal line 26a.

A temporary memory circuit is capable of temporarily storing, in a frame-by-frame fashion, the coded image information delivered to the signal line 26a. The data correctly received in frame-by-frame fashion is delivered to the signal line 28a.

An image memory circuit 30 is capable of storing the frame data available on the signal line 28a in corresponding image memory space. This memory circuit 30 therefore has to have a memory space large enough to store data corresponding at least to one block, though in the illustrated embodiment the image memory circuit 30 has a capacity corresponding to eight blocks. The data in the frames in which no error has been caused is delivered to a signal line 30a on a page basis or on a block basis. When clear pulse is generated on a signal line 40e, the signal line 30b is set to 0. The signal line 30b receives a bit map of the numbers of received frames. The image memory has a memory space of 8×64 bytes. When data is received, a receiving pointer on a signal line 40f administers the address in the image memory space at which the received data is to be stored. When data received in the image memory is extracted for decoding, a recording pointer on the signal line 40g administers from what address of the image memory space the data is to be extracted.

A circuit 32 receives the demodulated data available on the signal line 30a and delivers the data to a signal line 32a after an MH (Modified Huffman) decoding method or MR (Modified Read Decoding).

Numeral 34 denotes a recording circuit which receives the signal on the signal line 40h and, when this signal is of "0" level, receives the signal on the signal line 32a. The recording circuit 34, upon receiving of data of one line, records the data on a record paper, thus performing recording of data of successive lines. The recording circuit 34 receives also a signal from a signal line 40h and, when the level of this signal is "1", receives information on the signal line 40i, thereby recording this information. Furthermore, the recording circuit 34 sends a pulse to a signal line 34a upon completion of recording of image data corresponding to one page.

A counter circuit 36 is capable of counting the numbers of non-recorded pages remaining in the memory space backed-up by a battery, i.e., a memory space the content of which is never extinguished even in the case of a power failure. When a communication process is started, or when the power is turned on again from off state, the number counted by the counter circuit 36 is printed out if the number is not "0" and then the counter circuit 36 is reset. The counter circuit 36 is incremented by one upon each transmission of a message acknowledgement signal (MCF signal) which indicates that message of one page has been correctly received. The content of this counter circuit is decremented by one upon each completion of recording of message of one page. A control circuit 40 writes data in the non-recorded page number counter circuit 36 by delivering the data to a signal line 36a. After the delivery of the data to the signal line 36a, the control circuit 40 delivers a write pulse to the signal line 40k. On the other hand, when the control circuit 40 reads the number of the non-recorded pages out of the counter circuit 36, it delivers a read pulse through a signal line 40j and receives the data output to the signal line 36a.

A memory circuit 38 is capable of storing the communication administration information which is stored in the battery-backed-up memory space, i.e., in the memory space the content of which is never lost even in the event of a power failure. The communication administration information memory circuit 38 stores information concurrently with the start of one communication. If the power fails during the communication and then is recovered, the above-mentioned information is output if there is any non-recorded page information. When the control circuit 40 writes data to the communication administration information memory circuit 38, it delivers the communication administration information to a signal line 38a and then delivers a write pulse to a signal line 40m. On the other hand, when the control circuit 40 reads data from the communication administration information memory circuit 38, it delivers a rear pulse to a signal line 40l and then receives communication administration information delivered to the signal line 38a.

A memory 39 is capable of storing 2-byte data concerning the degrees of filling up of eight blocks (each being of 64 Kbytes) of the image memory 30. One of two bytes store information as to whether any data is stored in the memory. The least significant bit LSB stores information concerning the block 0 while the information concerning the block 7 is stored in the most significant bit MSB, with intermediate bits storing informations concerning corresponding blocks. For instance, the LSB is set to "1" when storage of information is commenced in the block 0. The other byte stores information concerning whether all the data which can be recorded in one block have been obtained. This byte information also includes bits corresponding to the respective blocks: namely, the least significant bit LSB is used for the data concerning the block "0" and the most significant bit MSB is allocated for the data of the block 7, with intermediate bits storing data of corresponding intermediate blocks. For instance, when data of one full or partial page without error has been stored during receiving of information in the block 7, "1" is set in the MSB.

Thus, the control circuit 40 mainly conducts various controls mentioned before. The recording operation is conducted in accordance with an interruption processing. The control circuit 40 is composed of a read-only memory (ROM) which stores a control program and a random access memory (RAM).

Figures 2, 7A:
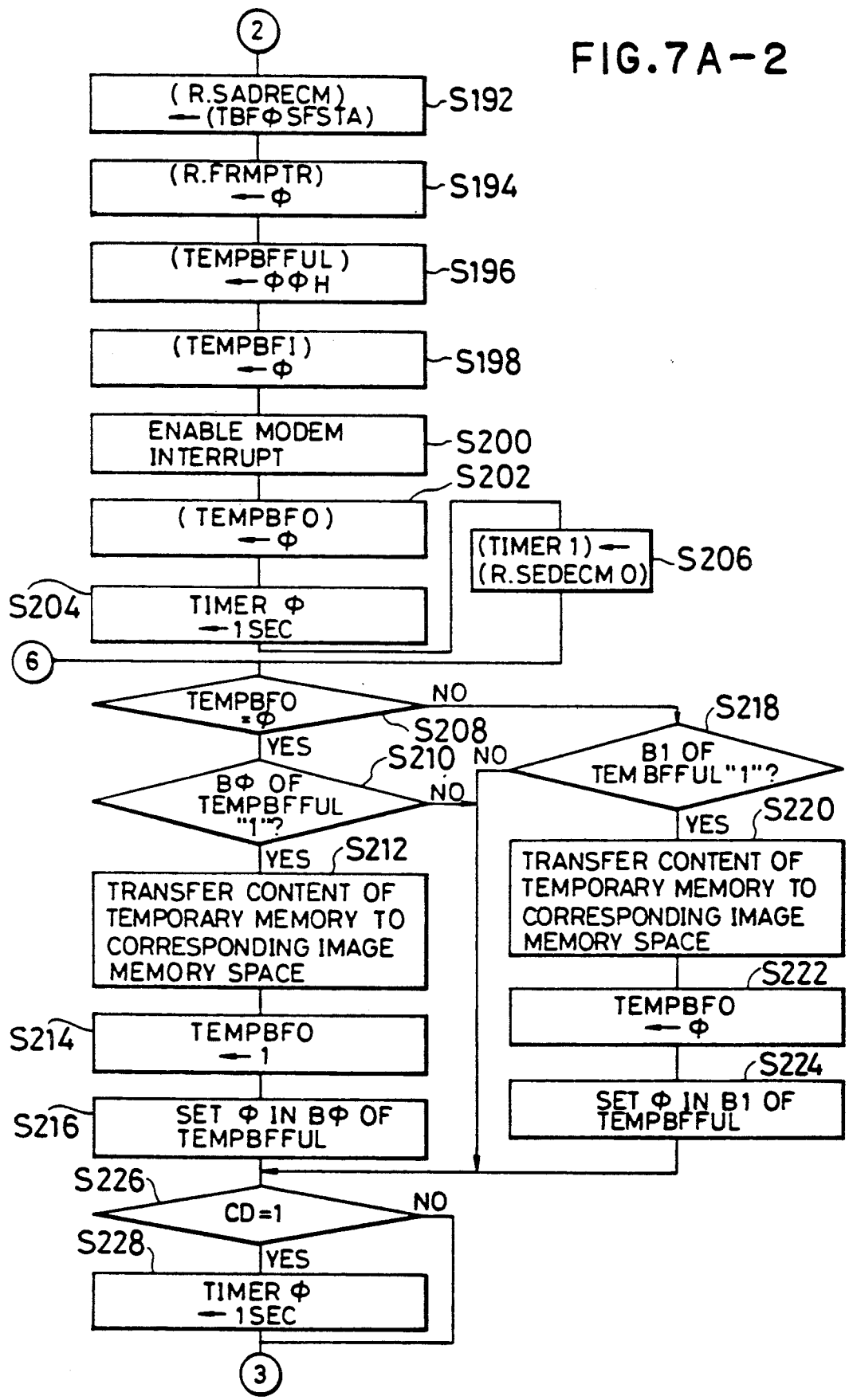
Figures 3, 7A:
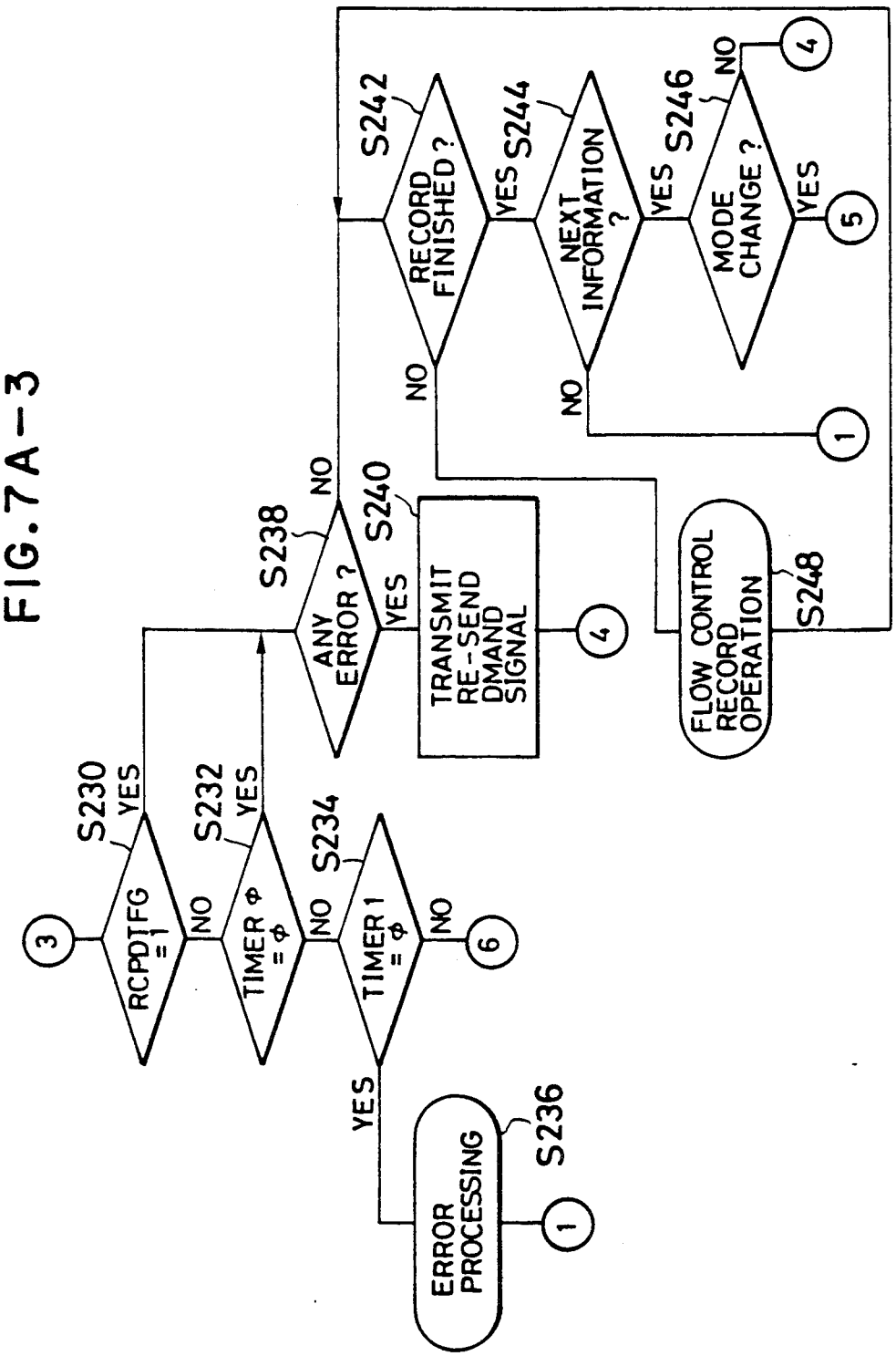

FIG. 2 is a flow chart showing the control operation performed by the control circuit shown in FIG. 1.

As the power is turned on, the facsimile apparatus starts to run from a step S 50 so that a signal of "0" level is delivered to the signal line 40h while the recording circuit 34 is reset to become ready for receiving signal from the signal line 32a.

In a step S 62, a signal of "0" level is delivered to the signal line 40a and, after turning off the ML, the proces proceeds to a step S 54.

In the step S 54, whether a specific key has been pressed is determined. This specific key is set in the pressed condition when the apparatus is initially installed and turns the power on so as to set the count value of the non-recorded page number to "0". When the power is initially turned on from the power-off state, the value in the counter for counting the number of non-recorded pages is not zero. Therefore, turning on of this specific key without pressing of the specific key causes information indicative of occurrence of a power failure, related communication administration information and number of the non-recorded pages to be output erroneously.

However, if the specific key is pressed down, the process proceeds from the step S 54 to a step S 60. Conversely, if the specific key has not been pressed, the proces proceeds from the step S 54 to a step S 56.

In the step S 56, the value in the counter circuit 36 indicative of the number of non-recorded pages is received by the control circuit 40 so that the latter determines whether the value is "0". If the answer is YES, the process proceeds to a step S 62 in which the circuit relay (CML relay) of the NCU 2 is turned off thereby connecting the telephone circuit line 2a to the telephone. In the event that the recording of all pages has not been completed despite of the transmission of the message "safely received" to the sending side, the value is determined to be not "0" in the judgment performed in the step S 56. In this case, the process proceeds to a step S 58 in which the communication administration information of the latest one communication stored in the communication administration information memory circuit 38 is input to the control circuit 40. The control circuit then outputs a signal of "1" level through the signal line 40h and the recording circuit 34 receives a signal from the signal line 40i so as to be set in a state ready for the recording of the above-mentioned information. Namely, the control circuit 40 delivers, through the signal line 40i, an information indicative of occurrence of a power failure, i.e., the fact that there still is an image which has be not been recorded, related communication administration information and information concerning the number of non-recorded pages, thereby allowing all this information to be recorded. After the completion of the recording, a cutting operation is conducted while a signal of "0" level is delivered to the signal line 40h so as to set the recording circuit 34 in a state ready for receiving and recording data delivered through the signal line 32a.

In a step S 60, the value in the counter circuit for counting the number of non-recorded pages is set to "0" and the process proceeds to a step S 62.

In the step S 62, a signal of "0" level is delivered to the signal line 40a thereby turning the CML off.

In a step S 64, a judgment is executed as to whether the facsimile receiving mode has been selected. If the selection of the facsimile receiving mode is confirmed, the process proceeds from the step S 64 to a step S 68. Conversely, if the facsimile receiving mode has not been selected, the process proceeds to a step S 66 in which various other processings are performed.

In a step S 68, a signal of "1" level is output to the signal line 40a and the CML is turned on thereby connecting the telephone circuit line 2a to the facsimile.

In a step S 70, a preparatory process for the facsimile communication process is executed. The process then proceeds to a step S 72. In the step S 72, a judgment is executed as to whether the present operation mode is an error correction mode, i.e., a mode for conducting an ECM (error correction mode) communication. If this mode is confirmed, the process proceeds from the step S 72 to a step S 80. Conversely, if the present mode is not the ECM communication mode, the process proceeds from the step S 72 to a step S 74.

In the step S 74, the remaining portion of the preparatory processing is executed.

In the step S 76, an image signal is received in ordinary semi-double communication mode. After the completion of the image signal, the process proceeds to a step S 78 in which a post-processing of the facsimile communication process is executed. The process then proceeds to a step S 62.

When the process has been proceeded from the step S 72 to the step S 80, information including abbreviation of the opposite station, communication start time and so forth is recorded in the communication administration information memory circuit 38.

In a step S 82, the remaining portion of the preparatory processing is executed. Thereafter, blocks in the circuit 39 for storing the states of eight blocks are fully controlled.

Reception of the image signal in the ECM mode is executed in steps S 84 and S 86.

More specifically, in the step S 86, a judgment is executed as to whether the RCP (Return to Control for Partial Page) has been detected. If the RCP signal has been detected, the process proceeds to a step S 88, whereas, when the RCP signal has not been detected, the process returns to the step S 84.

In a step S 88, whether error frame exists in the received frames is determined. If presence of an error frame is detected in the step S 88, the process proceeds to a step S 90 in which a signal demanding retransmitting of the error film, practically a PRP (Partial Page Request) signal, is produced. Conversely, when no error frame is found in the step S 88, the process proceeds to a step S 92 in which a message confirming good receipt of the image data, practically am MCF signal, is delivered. The process then proceeds to a step S 94.

In the step A 94, blocks of the circuit 39 for storing states of eight blocks are fully controlled. This control is executed by setting "1" in the bit corresponding to the block in which storage of image data of one page has been completed so as to enable this block to start recording. The data stored in the blocks corresponding to the bits in which "1" is set are recorded in accordance with a later-mentioned interrupt processing. After the completion of recording of the data in these blocks, the bits corresponding to these blocks are reset to "0".

In a step S 94, whether the present pagination is a physical pagination is determined. More practically, in the step S 96, the present pagination is determined to be a physical pagination when a signal such as PPA (Partial Page Signal)-MPS (Multi-Page Signal) or PPS-EOP (End Of Page Signal) or PPS-EOM (End Of Message) signal is received. In such a case, the process proceeds to a step S 98 in which the value in the counter circuit for counting the number of non-recorded page is incremented. Conversely, when the pagination is determined not to be a physical pagination, e.g., when a PPS-NULL or the like signal is received, the process proceeds to a step S 100.

In the step S 100, a judgment is executed as to whether next information exists. The process proceeds to a step S 104 when there is next information. However, when there is no next information, the process proceeds to a step S 102 in which a circuit cut signal, practically a DCN signal, is transmitted.

In the step S 104, the states of blocks stored in the memory circuit 39 for storing states of eight blocks to determine whether "1" is set in all the bits corresponding to eight blocks, i.e., whether all the eight blocks have been filled up. If all these blocks have been filled up, it is impossible to receive further information. In such a case, the process proceeds to a step S 108. Conversely, if all of the eight blocks have not been completely filled up, it is possible to receive the next information. In such a case, the process proceeds to a step S 108. In the step S 106, a flow control is executed in which the transmission of image signals from the sending side is suspended until an empty block is generated in the image memory and the transmission is re-started when an empty block is generated in the image memory.

In the step S 108, whether a mode change is conducted or not is determined. When the mode change has been executed, the process proceeds to the step S 72. If not, the process proceeds to the step S 84.

Figure 3:
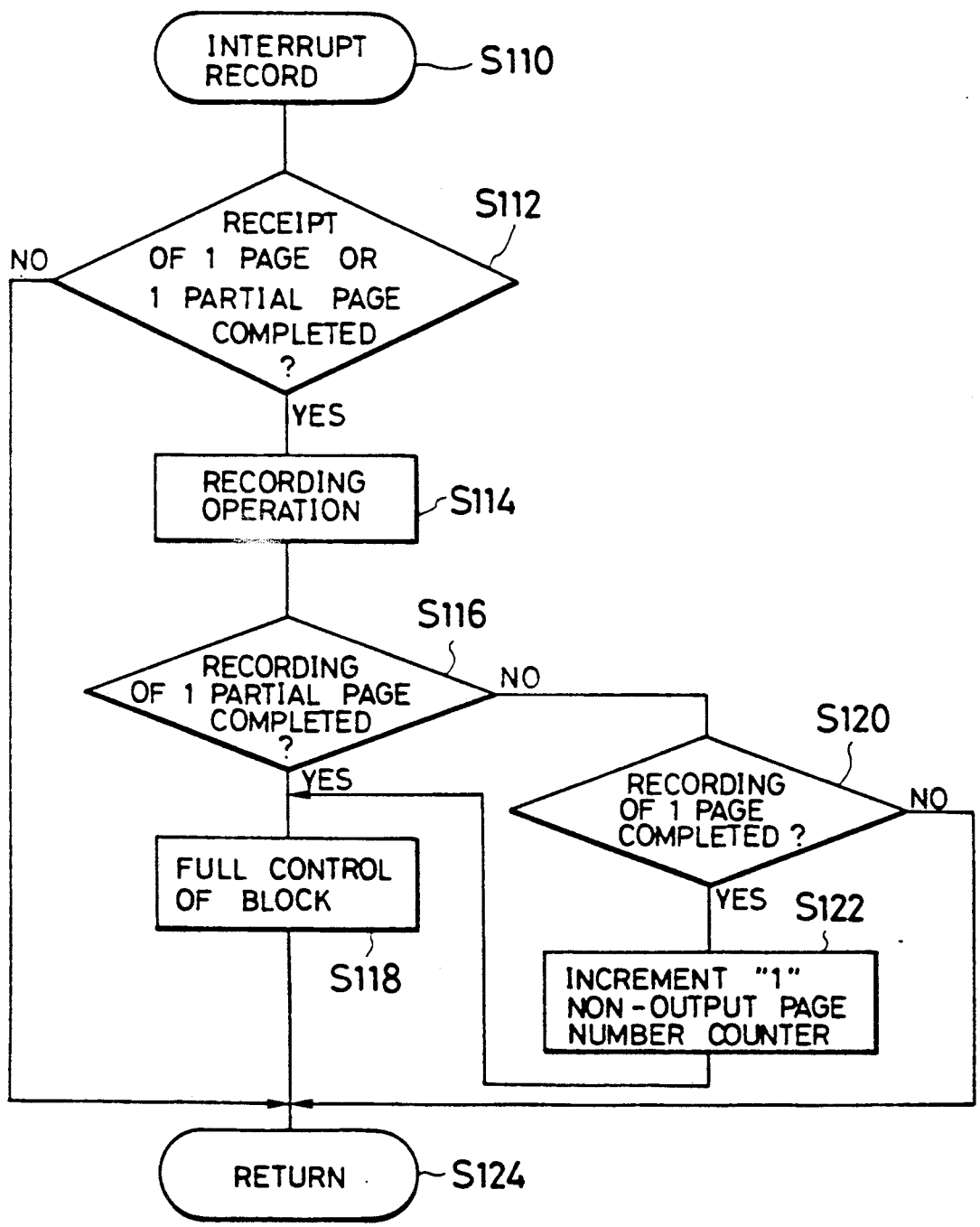
FIG. 3 is a flow chart illustrative of a recording interruption routine performed by the control circuit 40.

FIG. 3 is a flow chart illustrating the interrupt processing of a recording system.

The interrupt processing performed in the recording system is a timer-interruption processing, and is commenced when "1" is set for at least one of the eight blocks stored in the memory circuit 39.

The recording interruption process of FIG. 3 is commenced in a step S 110. The interruption process is started at a period set by a timer T. The receiving process and the recording process by interruption are seemingly executed in parallel with each other.

In a step S 112, the memory circuit 38 for recording the state of the eight blocks is checked to examine whether the receiving of one page or one partial page has been completed, i.e., whether image data of one page or one partial page is possible. When recording of one page or one partial page is possible, the process proceeds to a step S 114 in which an operation is conducted to record the image data of this one page or one partial page. Conversely, if the recording of image data of one page or one partial page is impossible, the process proceeds to a step S 124.

A step S 116 determines whether the recording of one partial page has been finished. If the answer is YES, the process proceeds to a step S 118 in which the corresponding block in the memory circuit 39 for storing the states of the eight blocks is cleared. If the recording of one partial page has not been finished, the process proceeds to a step S 120.

The step S 120 determines whether the recording of one physical page has been completed. If the recording of one physical page has been completed, the process proceeds to a step S 122 so that the value of the non-recorded page number counter circuit is decremented by one. If the recording of one physical page has not been completed, the process proceeds to a step S 124.

In the embodiment described above, the recording is conducted while data is being received in the memory, and a message acknowledgment signal (MCF) is transmitted back to the sending station when image data corresponding to one page has been received in the image memory. Therefore, the communication time can be shortened as compared with the case where the MCF is sent after completion of the recording of image data of one page.

It will be understood, however, that the invention can be applied also to an apparatus of the type in which the recording is started only after the receipt of all the data to be recorded, although in the described embodiment the recording and receiving are executed in a seemingly parallel fashion. The invention also can be applied to a case where the memory is designed to store the received data while the recording is suspended due to exhaustion of the recording paper in the receiving apparatus.

When data of one or more pages are accidentally left in the image memory without being recorded, the described embodiment records an information indicative of the occurrence of such an accident. The embodiment, however, may be modified such that the information is displayed on a display instead of being recorded or may be displayed and recorded simultaneously.

A description will be given of the second embodiment which is capable of receiving a low-speed control signal of 300 b/s subsequent to high-speed signal (image signal), even when retraining of the high-speed signal fails.

Figure 4:
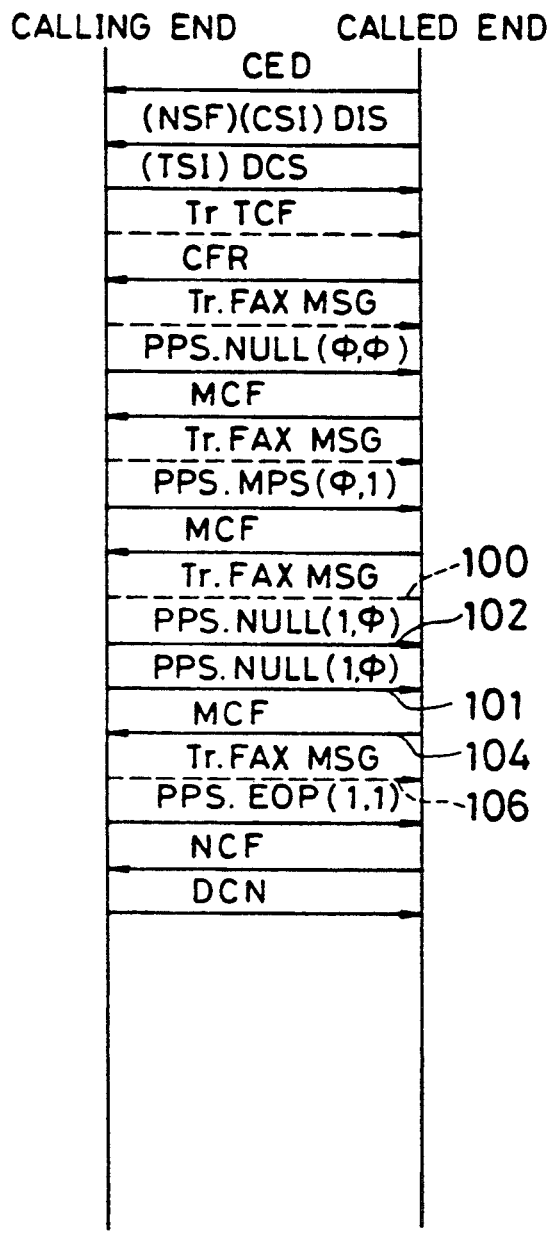
FIG. 4 is an illustration of a communication sequence of a facsimile apparatus as a second embodiment.
Figure 5:
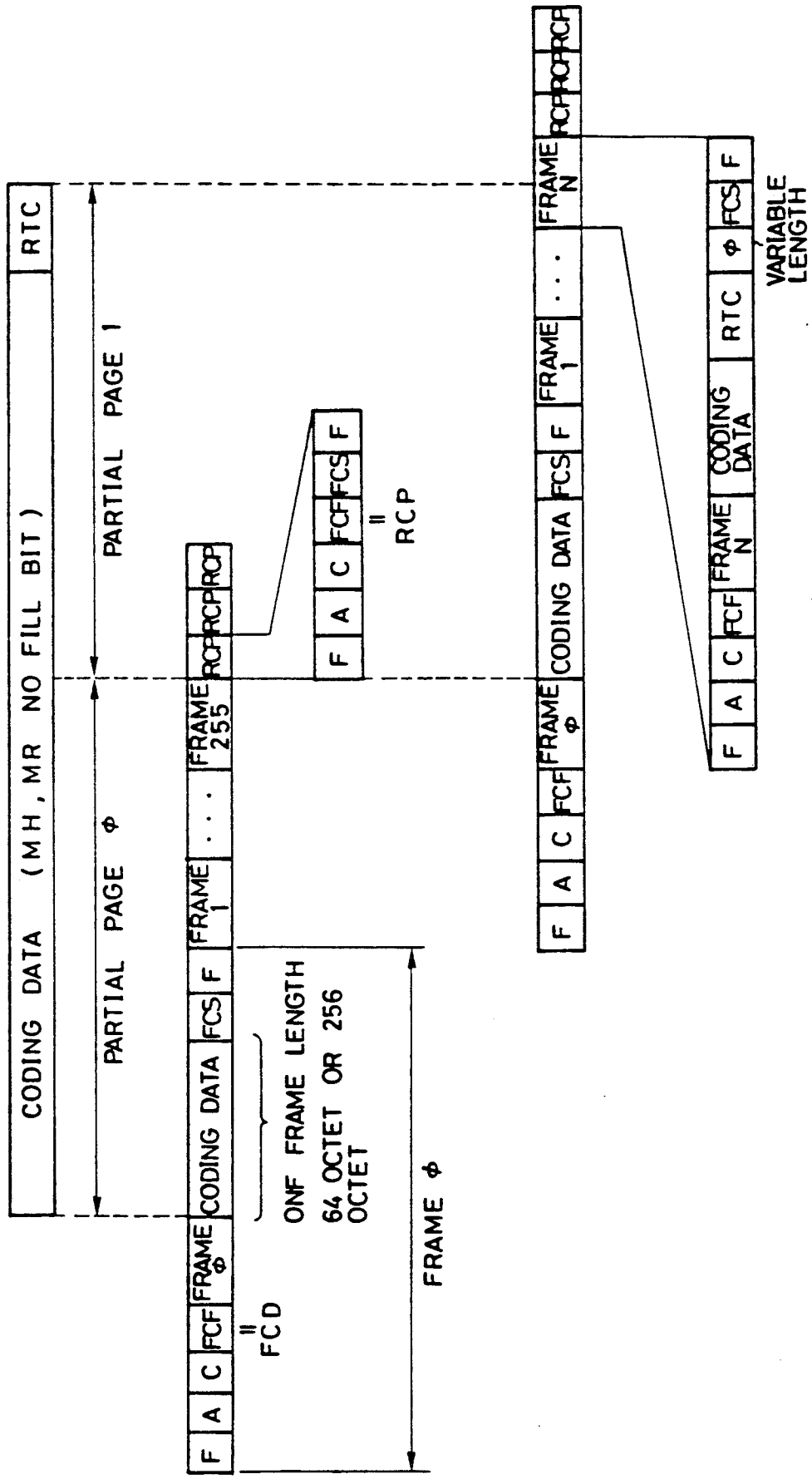
FIG. 5 is an illustration of formatting of image data handled in the second embodiment.

FIG. 4 illustrates an example of the communication sequence executed when no error is caused during receiving of HDLC-formatted high-speed signal in the second embodiment. On the other hand, FIG. 5 illustrates the construction of image signal data.

If a reset signal (RCP of FIG. 9) could not be received by the receiving apparatus due to disturbance of the high-speed image signal 100 by, for example, external noise, the apparatus undesirably remains in the high-speed signal receiving mode without being switched to the mode for receiving a low-speed control signal. In the second embodiment of the invention, however, the switching to the mode for receiving the low-speed control signal can be conducted without fail because a continuous omission of the carrier for a period of one second or longer can be detected at least during the period of retransmitting of the low-speed signal. Thus, the facsimile apparatus of this embodiment can receive the second PPS-NULL signal 101 and, hence, conduct subsequent communication, even in the case of disturbance of the high-speed signal by external noise or the like.

Referring to FIG. 4, when the sending apparatus has failed to receive the MCF signal 104, the sending apparatus conducts retransmitting of the PPS-NULL signal. The receiving apparatus, therefore, has to simultaneously receive both the high-speed signal and the low-speed signal after the transmission of the MCF 104. This requires a switching between the mode for receiving the low-speed signal and the mode for receiving the high-speed signal. In this embodiment, this switching operation is conducted in the following manner. Namely, switching to the mode for receiving the high-speed signal is effected when a high-speed flag is detected continuously for a predetermined period of time. If the above-mentioned detection of the high-speed flag fails, a command receiving operation is executed for a period which is the sum of the time required for transmission of one block at the current transmission speed and a predetermined margin time necessary for sending of the flag, receiving of the control signal (about 6 seconds) and so forth.

The following control is executed after the switching to the high-speed signal receiving mode.

Upon detection of an RCP signal, or one second or longer omission of the high-speed signal carrier, a command receiving operation is executed for a period which is the sum of the time required for transmission of one block at the current transmission speed and a predetermined margin time necessary for sending of the flag, receiving of the control signal (about 6 seconds) and so forth.

When no effective frame can be detected in a period which is the sum of the time required for transmission of one block at the current transmission speed and a predetermined margin time, or when no effective frame can be detected in a predetermined period, e.g., 60 seconds, after detection of one effective frame, the system judges that an error is taking place, and terminates the process after opening the circuit.

The system also judges that an error has been caused when an interrupt indicative of receipt of data is not received for a period of 255s. The system opens the circuit and stops the process also in this case.

The second embodiment will be more fully described with reference to the drawings.

Figure 6:
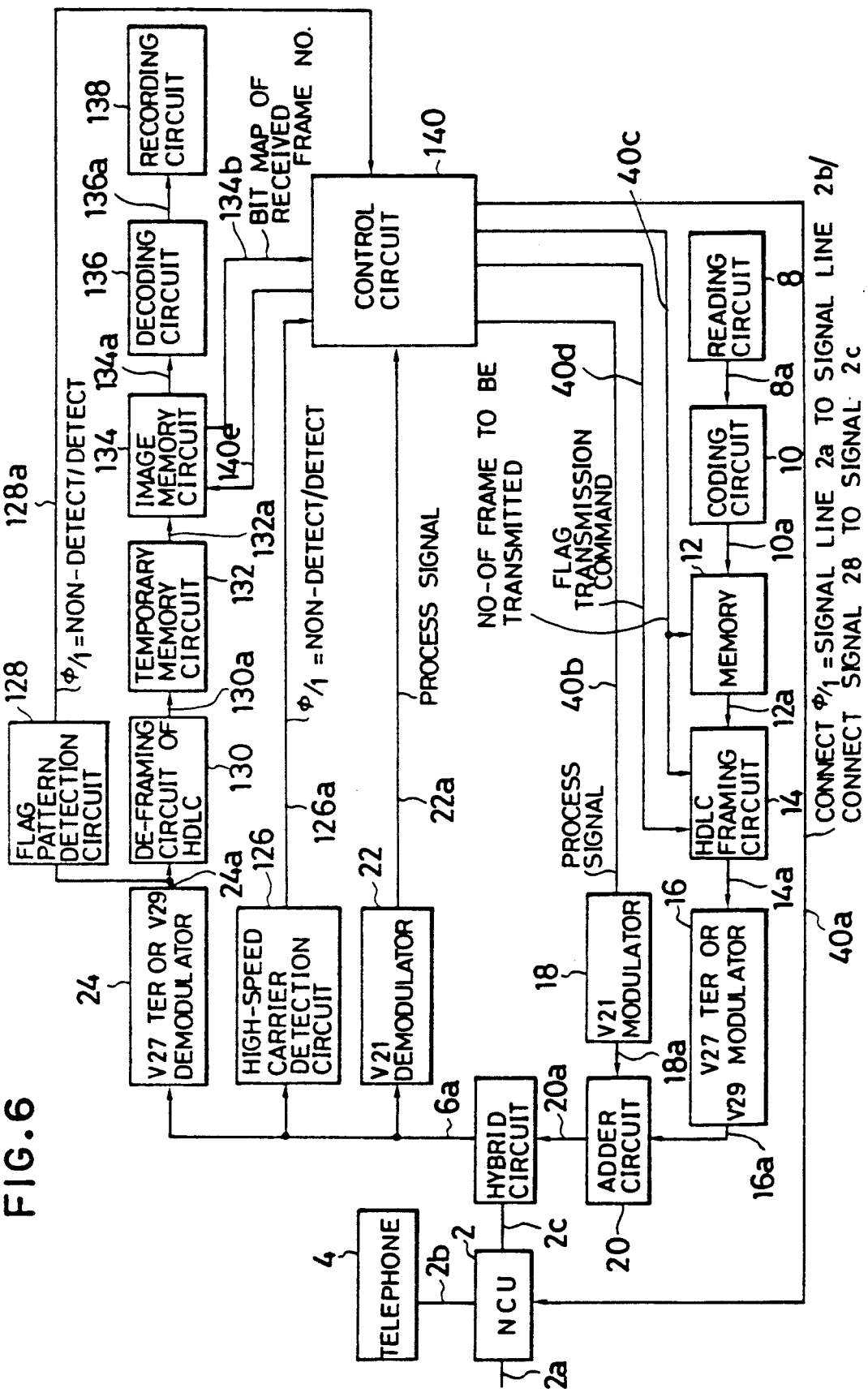
FIG. 6 is a block diagram of the facsimile apparatus of the second embodiment.

FIG. 6 is a block diagram showing the construction of a second embodiment of the facsimile apparatus as the second embodiment of the invention.

In this Figure, the same reference numerals are used to denote the same components as those appearing in FIG. 1 and detailed description thereof is omitted. In the second embodiment of the invention, the control circuit 140 operates in a manner different from that performed by the control circuit 40 of the first embodiment, as will be understood from the following description taken in conjunction with FIG. 7.

Referring to FIG. 6, a circuit 126 is capable of determining whether a carrier of high-speed data in the form of V27ter or V29 recommended by CCITT is received, upon receipt of the signal from a signal line 6a. The circuit 126 delivers a signal of "1" level to a signal line 126a when it is in receipt of carrier of high-speed data in the form of V27ter or V29 recommended by CCITT. However, if the carrier of high-speed data in the form of V27ter or V29 recommended by CCITT is not received, the circuit 126 delivers a signal of "0" level to the signal line 126a.

A numeral 128 designates a circuit which determines whether a flag pattern is being detected, upon receipt of demodulated data which has been delivered to a signal line 24a. The circuit 128 delivers to a signal line 128a a signal of "1" and "0" levels, respectively, when it has detected the flag pattern and when it has not yet detected the flag pattern. More specifically, the circuit 128 has a memory space of 2 bytes. The circuit 128 initially delivers to the signal line 128a the signal of "0" level and changes the level of the signal to "1" when the 8-bit data received most currently is the flag pattern (7EH). Once the signal level on the signal line 128a is turned to "1", subsequent eight bits are not checked and, when the eight bits of the later half-part have become the 7EH pattern, the system determines whether the 8-bit data received most currently is a flag pattern or not. If the answer is YES, the signal on the signal line 1228a is maintained at "1". However, if the 8-bit data received most currently is not the flag pattern, the level of the signal on the signal line 128a is changed to "0". If the 8-bit data received most currently is a flag pattern, the above-mentioned check is executed repeatedly, whereas, when the 8-bit data received most currently is not a flag pattern, successive 8-bit data are checked and, when the data is changed to the flag pattern, the level of the signal on the signal line is changed to "1".

Reference numeral 130 denotes an HDLC deframing circuit which, upon receipt of the demodulated data on the signal line 124a, conducts a "0" delete of the HDLC data so as to deliver to a signal line 130a the data in the form before the HDLC formatting.

Reference numeral 132 designates a temporary memory circuit which is capable of temporarily recording, on a frame basis, the coded information delivered to the signal line 130a. Data correctly received on the frame basis is delivered to the signal line 132a.

Numeral 134 denotes an image memory circuit which stores frame data on the signal line 132a in corresponding portions of image memory space therein. This image memory circuit 134 is required to have a memory space of a size corresponding at least to one block. Data on successive frames are successively delivered to the signal line 130a until an error takes place. When a clear pulse is generated in the signal line 140e, the signal lines 134b are all set to "0". A bit map of numbers of the received frames is delivered through the signal lines 134b.

A circuit 136 is capable of receiving demodulation data from the signal line 134a and delivers to the signal line 136a a data decoded in accordance with MH (Modified Huffman) method or MR (Modified Read) method.

A recording circuit 138 receives signals from the signal line 138 and records these signal in a line-by-line fashion.

The control circuit 140 mentioned before is composed of a microcomputer and peripheral devices such as a ROM storing the control program and a RAM for temporarily storing data.

Figures 1, 7B:
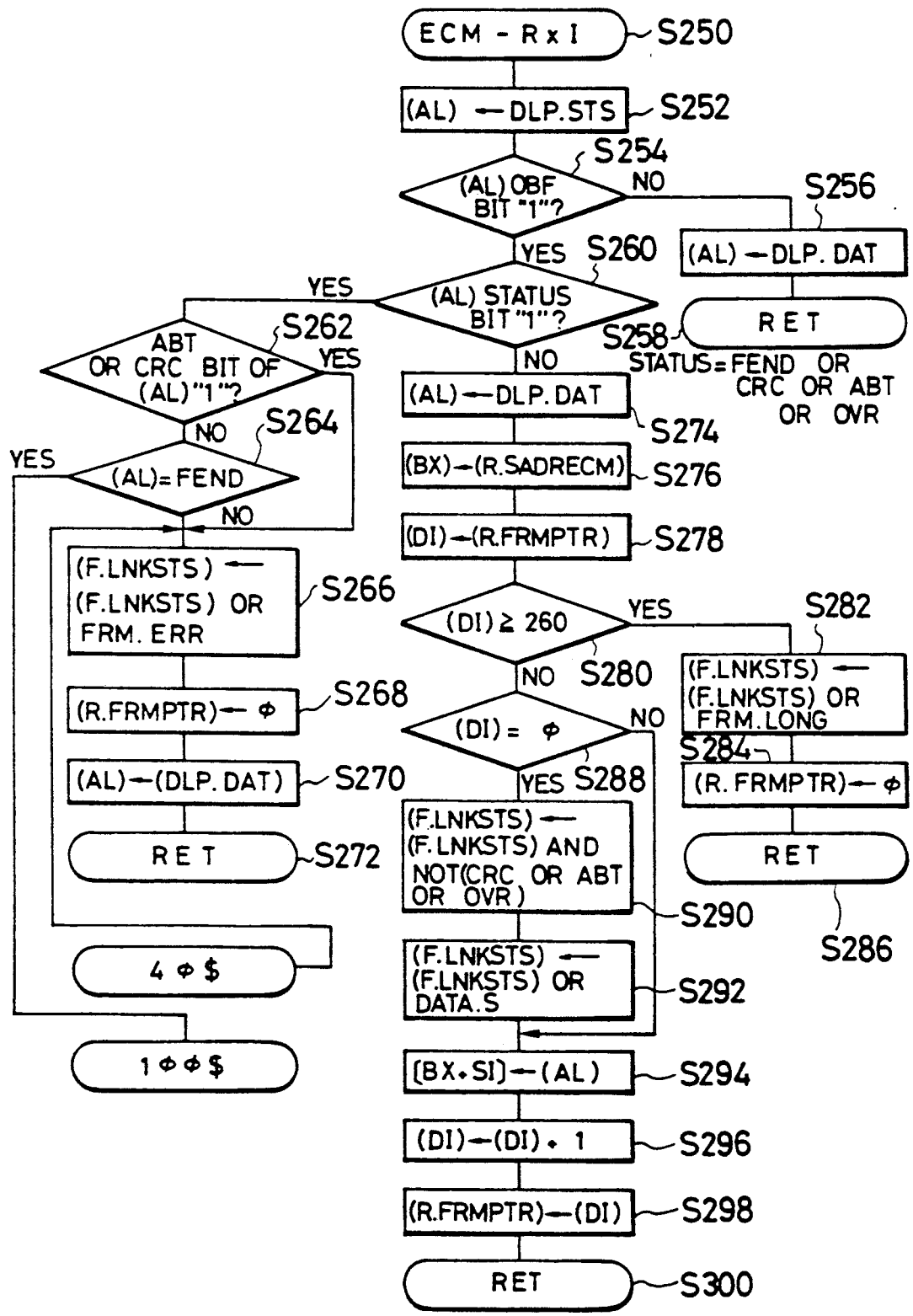

FIGS. 7A and 7B are flow charts illustrating the control operation performed by the control circuit 140. More specifically, FIG. 7A shows the main routine, while FIG. 7B illustrates an interruption routine executed when image signals are received.

Referring first to the main routine shown in FIG. 7A, a signal of "0" level is delivered to the signal line 40a in a step S 152 so that the CML is turned off and the telephone circuit 2a is connected to the telephone.

A step S 154 determines whether the facsimile receiving mode has been selected. If the answer is YES, the process proceeds from the step S 154 to the step S 158. However, if the facsimile receiving mode has not been selected, the process proceeds from the step S 154 to a step S 156.

In the step S 158, a signal of "1" level is delivered to the signal line 40a and, at the same time, the CML is turned on so as to connect the telephone circuit 2a to the facsimile.

Preparatory processings of the facsimile communication process recommended by CCITT are executed in steps S 160, S 162, S 164 and S 170.

In a step S 162, judgment is executed as to whether the ECM communication (error correction mode) has been selected or not. If the ECM communication mode has been selected, the process proceeds to a step S 170. However, if the ECM communication has not been selected, the process proceeds to a step S 164.

The steps S 164 and S 179 execute the remaining preparatory processings. After the completion of execution of the remaining preparatory processings in the step S 164, receiving of image signals in the G3 mode is executed in a step S 166. After the completion of the receiving, post-processings of the facsimile communication process are executed in a step S 168 and then the process returns to the step S 152.

Conversely, when the communication mode is determined to be the ECM communication in the step S 162, the process proceeds to the step S 170 as described so as to execute the remaining preparatory processings. Then, the process proceeds to a step S 172 in which a timer value is set in a timer R.SEDECMO which is used in accordance with the time required for receiving high-speed data in advance of detection of an effective frame (this time varies according to transmission speed) or in accordance with the time for receiving a processing signal of 300 b/sec. For instance, when the transmission speed is 2400 b/sec, the time value set in the R.SEDECMO is 250 seconds. Similarly, time values of 150 seconds, 120 seconds and 100 seconds are set in the R.SEDECMO when the transmission speed is 4800 b/s, 7200 b/s and 9600 b/s, respectively. The reason why these timer values are selected is as follows.

It is assumed here that the data has a size of 256 bytes. In addition to the 256 bytes allocated for the data, each frame includes one byte for a flag field, one byte for an address field, one byte for a control field, one byte for an FCD field, one byte for frame number field and 2 bytes for an FCS. Thus, each frame has a size of 263 bytes. When only the NULL blocks are transmitted without sending the flag, transmission time is determined by dividing the product $263 \times 8 \times 256$ with the transmission speed. When the transmission speed is 2400 b/sec, 4800 b/sec, 7200 b/sec and 9600 b/sec, the transmission time is calculated as 244 sec, 112 sec, 75 sec and 56 sec, respectively. The aforementioned timer value to be set in the timer R.SEDECMO is determined by adding the time required for the flag which is transmitted at 300 b/sec to the transmission time calculated as above.

A step S 174 sets 60 seconds in a timer R.SEDEMN which produces an error signal when no effective frame is detected within a set time from detection of one effective frame after switching to the high-speed signal receiving mode.

The process then proceeds to a step S 176 in which the apparatus is set for receiving high-speed signals.

Judgment is executed as to whether the high-speed flags have been continuously received for a predetermined period B within a predetermined period A, when the system was switched to the high-speed signal receiving mode. To this end, in the step S 178, the predetermined period A which varies according to the transmission speed is set in the timer 0. On the other hand, the predetermined period B is set in a timer 1 in accordance with the transmission speed in a step S 180.

The reasons for determination of these predetermined periods A and B will be explained hereinafter.

Referring first to the period B, the time or period of five successive flags varies depending on the transmission speed as follows.

Training Time

| 2400 b/sec | 1159 msec |
| 4800 b/sec | 923 msec |
| 7200 b/sec | 253 msec |
| 9600 b/sec | 253 msec |

Period of Five Flags

| 2400 b/sec | $\frac{5 \times 8}{2400}$ | = 16.7 msec |
| 4800 b/sec | $\frac{5 \times 8}{4800}$ | = 8.3 msec |
| 7200 b/sec | $\frac{5 \times 8}{7200}$ | = 5.6 msec |
| 9600 b/sec | $\frac{5 \times 8}{9600}$ | = 4.2 msec |

Maximum Delay Time in International Communication Line 1.25

Time required for the opposite station to start high-speed transmission after receipt of the 300 b/sec signal 0.55

Probability of Generation of Five Successive Flag Patterns $1/2^{40} = 9.1 \times 10^{-13}$ The time is set to enable checking as to whether five flags are continuously detected in one second after the system has been set for receiving the training signal.

| 2400 b/sec | 1.16 + 1.2 + 0.5 + 1.0 = 3.86 | (s) |
| 4800 b/sec | 0.92 + 1.2 + 0.5 + 1.0 = 3.62 | (s) |
| 7200 b/sec | 0.25 + 1.2 + 0.5 + 1.- = 2.95 | (s) |
| 9600 b/sec | 0.25 + 1.2 + 0.5 + 1.0 = 2.95 | (s) |

The probability of eventual formation of five successive flags within one second is expressed as follows, since the bit number is the greatest when the transmission speed is 9600 b/sec.

$1/2^{40} \times 9600 = 8.7 \times 10^{-9}$

Thus, the probability of eventual formation of five continuous flags is extremely small. It is therefore materially possible to determine whether the high-speed image signal is being received, by detecting five continuous flags in one second.

Thus, the time B is the time length corresponding to five successive flags at respective transmission speeds.

On the other hand, the period A is determined as the sum of the training time for the high-speed signal, maximum delay time which may be caused in the international circuit, the time required for the opposite station to start transmission of the high-speed signal after receiving a 300 b/sec signal, e.g., CFR or MCF, and one second.

In steps S 182, S 184, S 186, S 188 and S 190, judgment is executed as to whether high-speed signal flags are continuously detected throughout the predetermined period B within the predetermined period A after operation for switching to the mode for receiving the high-speed signal. When consecutive high-speed flags are detected, the operation mode is switched to the high-speed signal receiving mode in the step S 192. Conversely, when the flags of high-speed signal are not detected, the time stored in the .SEDECMO, which is the sum of a predetermined time and the time required for one block to be transmitted at the instant transmission speed, is set in a timer 2 and the process proceeds to a state for receiving command.

The step S 184 determines whether the time set in the timer 1 is over, i.e., whether the predetermined period B has passed. The process then proceeds to a step S 192 in which the high value for the receiving of data by a temporary buffer is set. The address is composed of 20 bits. More specifically, the address has a pair of 16-bit addresses: namely, a high address and a low address. The values of the high address are shifted to the left by four bits and added to the bits of the low address, whereby the 20-bit address is formed. The temporary buffer is composed of a temporary buffer 0 and a temporary buffer 1 each having a memory space of 512 bytes.

In a step S 194, 0000H is set in the low-side pointer R.FRMPTR for receiving by the temporary buffer.

In a step S 196, 00H is set in a flag TEMPBFFUL which indicates whether the temporary buffer 0,1 is empty or full. When the bit B0 of TEMPBFFUL is "0", the temporary buffer "0" is empty, whereas, when B0 is "1", the temporary buffer 0 is full. The bit B1 being "0" and "1" respectively represents that the temporary buffer 1 is empty and full.

In a step S 198, "0" is set in a flag TEMPBF1 which represents in which temporary buffer the data is to be stored. When the TEMPBF1 is "0", data is put next into the temporary buffer "0", whereas, when the TEMPBF1 is "1", data is put next in the temporary buffer "1".

A step S 200 enables an interrupter of the receiving MODEM.

In a step S 202, a flag TEMPBFO indicating to which temporary buffer the data is to be transferred from the image memory space is set to "0". When the flag TEMPBFO is "0", the data of the temporary buffer TEMPBF 0 is transferred to the image memory space. Conversely, when the temporary buffer TEMPBFO is "1", the data in the temporary buffer 1 is transferred to the image memory space when the buffer 1 has become full.

In a step S 204, one second is set in the timer 0 for checking omission of the carrier of the high-speed signal.

In a step S 206, the time value in the R.SEDECMO is set in the timer Timer 1. When detection of an effective frame fails over the period set in the timer Timer 1, the error routine is commenced to open the circuit and to terminate the sequence.

After execution of the step S 192 to S 206 mentioned above, the process proceeds to a step S 208 which determines whether the temporary buffer TEMPBF 0 is "0". If the answer is YES, the process proceeds to a step S 210 which determines whether the bit B0 of the temporary buffer TEMPBFFUL is "1", i.e., whether the temporary buffer "0" is full or nor.

If the bit B0 of the temporary buffer TEMPBFFUL is determined to be "1", i.e., that the temporary buffer 0 is full, the process proceeds to a step S 212 in which the content of the temporary buffer 0 is transferred to the corresponding memory space (step S 212). In a step S 214, the temporary buffer TEMPBFO is set to "1", whereas, in a step S 216, the the bit B0 of the temporary buffer TEMPBFFUL is set to "0". Conversely, if the bit B0 of the temporary buffer TEMPBFFUL is determined not to be "1", the process proceeds to a step S 226.

If the judgment in the step S 208 has proved that the state of the signal in the temporary buffer TEMPBFO is "1", a determination is executed in a step S 218 as to whether the state of the bit B1 of the TEMPBFFUL is "1", i.e., whether the temporary buffer 1 is full or not. If the bit B1 of the temporary buffer TEMPBFFUL is "1", i.e., if the temporary buffer "1" is full, a step S 220 is executed to transfer the content of the temporary buffer 1 to the corresponding image memory space. Then, after setting the temporary buffer TEMPBFO to "0" in the step S 222, the process proceeds to a step S 224 to set 0 in the bit B1 of the temporary buffer TEMPBFFUL.

Then, in a step S 226, whether the carrier of the high-speed signal is being detected, i.e., whether the level of the signal on the signal line 126a is "1". If the answer is YES, i.e., if the signal level on the signal line 126a is "1", one second is set in the timer Timer 0 in a step S 228.

In a step S 230, whether at least one RCP signal is detected is determined. When at least one RCP signal is detected, i.e., when the flag RCPDTFG is "1", the process proceeds to a step S 238. When an RCP signal is not detected, i.e., when the RCPDTFG is "0", the process proceeds to a step S 232.

In the step S 232, judgment is executed as to whether the state of the timer TIMER 0 is "0". i.e, whether the omission of high-speed signal carrier is detected continuously over one second. When the state of the timer TIMER 0 is "0", i.e., when the omission of the high-speed signal carrier is detected continuously over a period of 1 second or longer, the process proceeds to a step S 238. Conversely, when the state of the timer TIMER0 is not "0", i.e., if the omission of the high-speed signal carrier is detected over a period of one second or longer, the process proceeds to a step S 234.

In the step S 234, a judgment is executed as to whether the state of the timer TIMER 1 is "0", i.e., whether the detection of an effective frame has been failed throughout a period exceeding a predetermined time. When the state of the timer TIMER 1 is "0", i.e., when no effective frame could be detected throughout the period, the process proceeds to a step S 236 in which an error routine is commenced. Conversely, when the state of the timer TIMER 1 is not "0", i.e., when an effective frame or frames could be detected within the predetermined period, the process proceeds to a step S 208.

In the step S 238, a judgment is executed as to whether any error is involved in the received HDLC frame data. If there is any error, a step S 240 is executed to transmit a retransmission demand signal, practically a PPR signal. Conversely, when there is no error, the process proceeds to a step S 242.

The step S 242 determines whether the recording has been finished or not. If the recording has not been finished yet, the process proceeds to a step S 248 in which a flow control is executed to cause the transmission side to temporarily suspend the transmission of the image signal. Conversely, if the recording has been completed, the process proceeds to a step S 244 to examine whether there is any next information. When it is judged that there is a next information in the step S 244, the process proceeds to a step S 246. Conversely, if there is no next information, the process proceeds to a step S 152. In the step S 246, whether thee is any mode change is judged. If the answer is YES, the process proceeds to a step S 160. However, if there is no mode change, the process proceeds to a step S 172.

FIG. 7B is a flow chart illustrating the interrupt processing of the MODEM at the time of receiving the image signal.

In the following description, a symbol DLS,STS is used to represent information concerning the status of a data link processor. A flag FEND is set to "1" when a flag pattern (0111 1110B) is detected.

The flag CRC checks the FCS when the condition FEND=1 is met, and determines whether correct frame data has been received. The level of FCS is "0" and "1", respectively, when correct frame data has been received and when correct frame data has not been received.

A flag ABT is set to "1" when 7 or more "1" levels are detected.

A flag OVR is set to "1" when the main system does not input the data received in the preceding operation even after the next byte data have been prepared while the buffer is full.

After inputting of the DLP,STS information in a step S 252, the process proceeds to a step S 254 in which a judgment is executed as to whether the flag OBF (Output Buffer Full) is "1". When the level of the OBF is "0", dummy data is input in the step S 256 and the process returns in the step S 258. Conversely, if the state of OBF is "1", the process proceeds to a step S 260 in which a judgment is executed as to whether one of FEND, CPC, ABT and OVR is "1". If the answer is YES, the process proceeds to a step S 262. However, if none of these flags is at the "1" level, the process proceeds to a step S 274.

In the step S 262, judgment is executed to determine whether one of the flags ABT and CRC is "1". If one of these flags is at the "1" level, the process proceeds to a step S 266. If not, the process proceeds to a step S 264.

In the step S 264, judgment is executed as to whether the flag FEND is "1". If the data of one frame has been correctly received, the flag FEND is set to "1" so that the process proceeds to a step S 302. However, if the state of the flag FEND is "0", the process proceeds to a step S 266.

In the step S 266, occurrence of a frame error is added to the F.LNKSTS. In a step S 268, R.FRMPTR is set to "0" and, after entry of one byte data in the step S 270, the process returns in a step S 272.

On the other hand, when the process proceeds from the step S 260 to the step S 274, one-byte data is successively entered.

The values of the R.SADRECM and R.FRMPTR are set to BX and DI, respectively, in steps S 276 and S 278.

In a subsequent step S 280, a judgment is executed as to whether the DI, i.e., the received data of one frame, has exceeded 260. It would be extraordinary if the DI, i.e., the received data of one frame, exceeds 260. In this case, therefore, a message indicative of an error, i.e., a too large length of frame, is written in the F.LNKSTS in a step S 282. Then, after the R.FRMPTR is set to "0" in a step S 284, the process returns in a step S 286. However, when the judgment in the step S 280 has proved that the DI, i.e., the received data of one frame, is below 260, the process proceeds to a step S 288.

The step S 288 determines whether the level of DI is "0". If the answer is YES, error information of CRC, ABT and OVR of the F.LINKSTS is set to "0" in a step S290. Then, after setting the DATA.5 to "1" in a step S 292, the process proceeds to a step S 294.

In the step S 294, input data of one byte is stored in the temporary memory space and, in a step S 296, the level of DI is incremented by one. Subsequently, in a step S 298, the value after the increment is set in the R.FRMPTR and then the process returns in a step S 300.

In a step S 302, the value of the R.SADRECM is set in the SI.

In the step S 304, the content of the address SI+2, i.e., the content of the FCF is checked. Namely, whether the content of the FCF is RCP(86H) is determined. If the answer is YES, "1" the process proceeds to a step S 306 in which "1" is set in a flag RCPDTFG which indicates that the RCP is detected. The process then proceeds to a step S 308 in which one-byte data is input and then returns in a step S 310.

Conversely, if the determination in the step S 304 has proved that the content of the flag FCF is not RCP (86H),the process proceeds to a step S 312 in which a judgment is executed as to whether the content of the address SI is OFFH, i.e.,whether the address information has been correctly received. The process then proceeds to a step S 314 in which a judgment is executed as to whether the content of the address SI+1 is 03H, i.e., whether the control information has been correctly received. In a subsequent step S 316, a judgment is executed as to whether the content of the address SI+2 is 06H, i.e., whether the FCD has been received correctly. If the address information, control information and the FCD have been correctly received, the process proceeds to a step S 318. However, if all this information could not be received correctly, the process proceeds to a step S 266.

In the step S 318 and in a subsequent step S 320, the value of the R.SEDECMN is set in the timer TIMER1.

Then, in a step S 322, the flag TEMPBF1 which represents to which one of the temporary buffers the data is to be input is checked. If the content of the TEMPBF1 is "0", i.e., if the data has been input to the temporary buffer 0, the process proceeds to a step S 332 and then to a step S 334, In these steps, the value of the TBFISFSTA is set in the R.SADRECM and the process then proceeds to a step S 336 in which "1" is set in the bit B0 of the TEMPBFFUL. In a step S 340, "0" is set in the R.FRMPTR and, after entry of one-byte data in a step S 342, the process returns in the step S 344.

If the judgment in the step S 322 has proved that the state of the flag TEMPBF1 is "1", i.e., if the data has been input to the temporary buffer 1, the process proceeds to a step S 324 and then to a step S 326. In these steps, the content of the TBFOSFSTA is set in the R.SADRECM and, in a step S 328, "1" is set in the bit B1 of the TEMBBFFUL. The process then proceeds to a step S 330 in which "0" is set in the TEMPBF1.

In the second embodiment as described, the system conducts receiving of commands throughout a period which is determined by adding a margin time to a time required for transmission of one block at the current transmission speed and is set in the timer TIMER2, when an RCP is detected or when omission of the carrier of the high-speed signal longer than one second is detected during receiving of high-speed data after switching to the mode for receiving high-speed signal.

The period over which the receiving of command is conducted, however, may be determined by checking the number of the frame received most currently, subtracting this number from 255 so as to determine the maximum number of the frames to be received thereafter, determining the time required for transmitting this maximum number of frames at the instant speed and then adding a margin time to the transmission time.

After completion of receiving of high-speed signals, if any error frame is contained in the received frames, the system starts to receive the high-speed signal again after transmitting a retransmission demand signal, practically a PPR signal. In this case, the timer value to be set in the R.SEDECMO may be set to be the time which is determined by adding a margin time to the time required for transmitting, at the instant transmission speed, the frames which are to be retransmitted, determined by subtracting the number of frames correctly received from the frame number set by the PPS-Q. Needless to say, when a signal such as an MCF has been transmitted after confirmation of elimination of error frame, the R.SEDECMO is reset.

In the embodiment described hereinbefore, the timer value to be set in the R.SEDECMO is determined on an assumption that data of one frame has 256 bytes. This, however, is only illustrative and the timer value to be set in the R.SEDECMO maybe varied depending on the number of bytes, e.g., 64 bytes.

A description will be given of a third embodiment which, when an image error has been caused during communication in an error correction mode, enables any error with respect to the physical page of the transmission side to be recognized.

The outline of the third embodiment will be described before commencing detailed description.

A facsimile apparatus as the third embodiment has a memory capacity of n-planes or buffers, each plane being assumed to have a memory capacity of 64 kbytes. During ECM communication after selection of an error correction mode, if any uncorrectable frame, i.e., an error frame, exists in a block, the transmission of this block is suspended and a signal EOR-Q (or PRI--EOR-Q) is received while a signal ERR(PIN) is transmitted. In the third embodiment, in such a case, an information indicative of occurrence of such an error in the recorded image is recorded. On the other hand, the receiving apparatus does not produce a sheet-cut instruction. When one physical page sent from the sending apparatus is finished, the receiving apparatus starts to record information. If the transmission of block information containing any uncorrectable error frame is suspended before completion of data of one physical page of the sending side, a sign or message indicative of the presence of such an error is recorded on the recording paper of the receiving side corresponding to the one physical sent page. If the one physical sent page is received on a plurality of physical pages at the receiving side, the sign or message indicative of presence of error is recorded on each of such physical receiving pages corresponding to one physical sent page. The facsimile apparatus of the third embodiment may be of the type which operates with cut sheets or of a type which operates with a continuous rolled sheet of recording paper.

The third embodiment will be described in detail hereinunder with reference to the accompanying drawings.

FIG. 8 is a block diagram of a third embodiment of the facsimile apparatus of the present invention. In this Figure, the same reference numerals are used to denote the same parts or members as those appearing in FIG. 1 and detailed description thereof being omitted.

Referring to FIG. 8, a numeral 230 denotes a memory circuit having a memory space having n planes, each plane having a size of 64 kbytes. Assuming here that one frame contains 256 bytes, in case of a NULL block, one block contains 256 (byte/frame)×256 (frame/block)=65536 bytes. The number n of the planes is assumed to be 8. In operation, frame data delivered through a signal line 28a are sent to and stored in a corresponding image memory space of the plane selected out of the planes 1 to 8 in accordance with a signal from a signal line 38f. For instance, when a signal "0" is delivered through the signal line 38f, the frame data available on the signal line 28a are not entered. Signal lines 230b deliver a bit map of 32 bytes (256 bits) representing whether the frame information has been correctly received in the block information which is being received. When a clear pulse is generated on a signal line 38e, all the signal lines 230b are set to "0". The image memory circuit 230 is capable of delivering to the signal line 230a the information of the plane available on a signal line 38g. when "0" is being output to the signal line 38g, no data is delivered to the signal line 230a.

A numeral 232 designates a circuit which receives demodulated data on a signal line 230a and delivers to a signal line 232a decoded data decoded in accordance with MH (Modified Huffman) decoding or MR (Modified Read) decoding method.

A reference numeral 234 designates a recording circuit which receives the signal on the signal line 232a when a signal of "0" level is delivered through the signal line 38i and receives a signal on a signal line 236a when the level of the signal on the signal line 38i is "1", thereby effecting recording in a line-by-line fashion.

Information output circuit 236 is capable of successively delivering to a signal line 236a signals a specific bit pattern indicative of a message such as "PLEASE NOTE IMAGE ERROR EXISTS" when a pulse is generated in the signal line 38h.

Figures 1, 9:
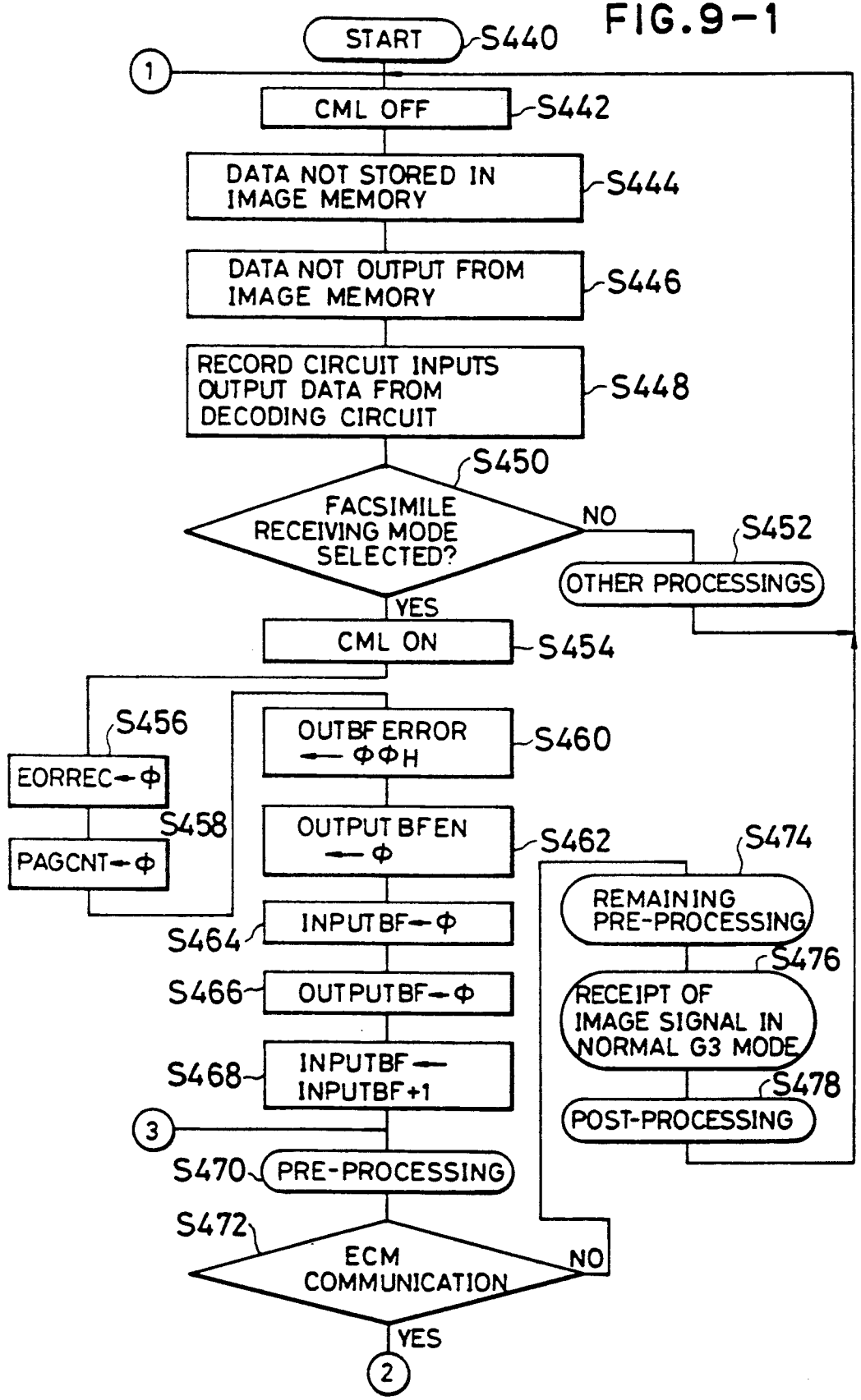
Figures 2B, 9:
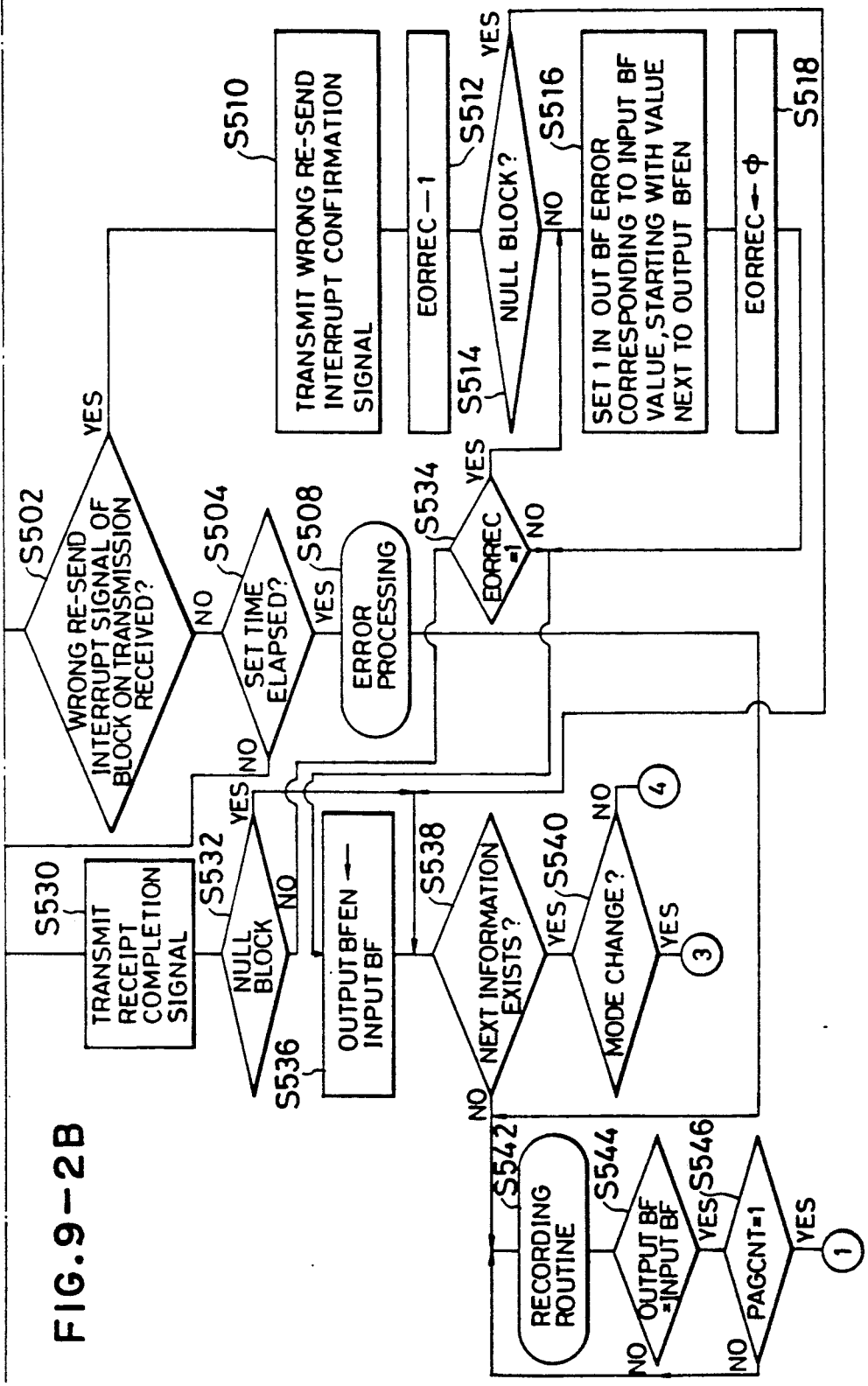

FIG. 9 is a flow chart illustrating the operation of a control circuit 240 in the apparatus shown in FIG. 8. It is assumed here that a rolled sheet type recording paper is used.

In a step S 442, a signal of "0" level is delivered to the signal line 40a so that the CML is turned off to connect the telephone circuit line 2a to the telephone 4.

In a step S 444, a signal of "0" level is delivered to the signal line 38f so as to set the system in a mode for inhibiting storage of the data in the image memory circuit 230.

In a subsequent step S 446, a signal of "0" level is delivered to the signal line 38g so as to set the system in a mode for inhibiting delivery of data from the image memory circuit 230.

In a step S 448, a signal of "0" level is delivered to the signal line 38i so as to set the system in a mode for enabling the recording circuit 234 to receive output data delivered through the decoding circuit 232.

In a step S 450, whether the facsimile receiving mode has been selected is determined. If the facsimile receiving mode has not been selected, the process proceeds to a step S 452 to execute other processing. However, if the facsimile receiving mode has been selected, the process proceeds to a step S 454.

If the selection of the facsimile receiving mode has not been confirmed in the step S 450, steps S 452, S 442, S 444, S 446, S 48 and S 450 are repeatedly executed.

In a step S 454, a signal of "1" level is delivered to the signal line 40a so that the CML is turned on to connect the telephone circuit line 2a to the facsimile apparatus.

Then, in a step S 456, "0" is set in a flag EORREC which represents whether a signal EOR-Q(PRI-EOR-Q) has been received during receiving of one physical page sent from the sending apparatus. When the EOR signal is received, this flag is set to "1".

In the subsequent step S 458, "0" is set in a flag PAGCNT. This flag is reset to "1" when the transmission of one sent physical page is finished and set to "0" when the data to be recorded next is stored in the image memory.

In a step S 460, 00H is set in an 8-bit flag OUTBFERROR which indicates in which one of eight planes or buffers the error data is contained. In case that EOR or ERR is sent or received in one of the blocks of a page, information indicative of the presence of error is set in all these blocks. B0 stores the information of the blocks of the first plane. Similarly, information of blocks of the second, third, fourth, fifth, sixth, seventh and eighth planes is stored in B1, B2, B3, B4, B5, B6 and B7, respectively.

In a step S 462, "0" is set in a counter OUTPUTBFEN which represents the maximum number of the planes with which the recording of data is possible. In this case, since the number of the planes is assumed to be 8, "1" comes next to "8". This applied also to the cases of the later-mentioned counters INPUTBF and OUTPUTBF.

In a step S 464, "0" is set in the counter INPUTBF which indicates the number of the plane which is in receipt of the received data.

In a step S 466, "0" is set in the counter POUTPUTBF which indicates the number of the plane carrying the data which is being recorded.

The process proceeds to a step S 486 after execution of resetting of flags and counters in the steps S 456 to S 466. In the step S 468, the counter INPUTBF is incremented by one.

Then, the preparatory processing of the CCITT-recommended facsimile communication process is executed in a step S 470. The communication mode is determined by this preparatory process.

In a step S 472, whether an ECM communication(error correction mode) has been selected. If this mode has been selected, an answer YES is given to the question posed in the step S 472 so that the process [proceeds to a step S 482. However, if the ECM communication has not been selected, the process proceeds from a step S 472 to a step S 474 so as to execute the remaining preparatory processing. The process then proceeds to a step S 476 in which receiving of image signals is executed in ordinary G3 mode. Subsequently, the receiving of image signal in ordinary G3 mode is conducted in a step S 476.

After completion of the image signals, the post-processing is executed in a step S 478 and then the process returns to the step S 442.

In the step S 480, the remaining preparatory processing is executed as in the step S 474 and the receiving of image signals in the ECM mode is executed.

In the steps S 482, S 484 and S 486, the value in the INPUTBF is incremented by one. If the content of the INPUTBF has reached "9", "1" is set in the INPUTBF.

When the value in the INPUTBF is not "9", the process proceeds from the step S 484 to a step S 488, whereas, if the value in the INPUTBF has reached 9, "1" is set in the INPUTBF in the step S 486 so that the process proceeds to a step S 488.

In the step S 488, the value (count value) set in the INPUTBF is delivered to the signal line 38f and the decoded information available on the signal line 28a is stored in the plane (block) of the image memory indicated by the value in the INPUTBF.

Figure 10:
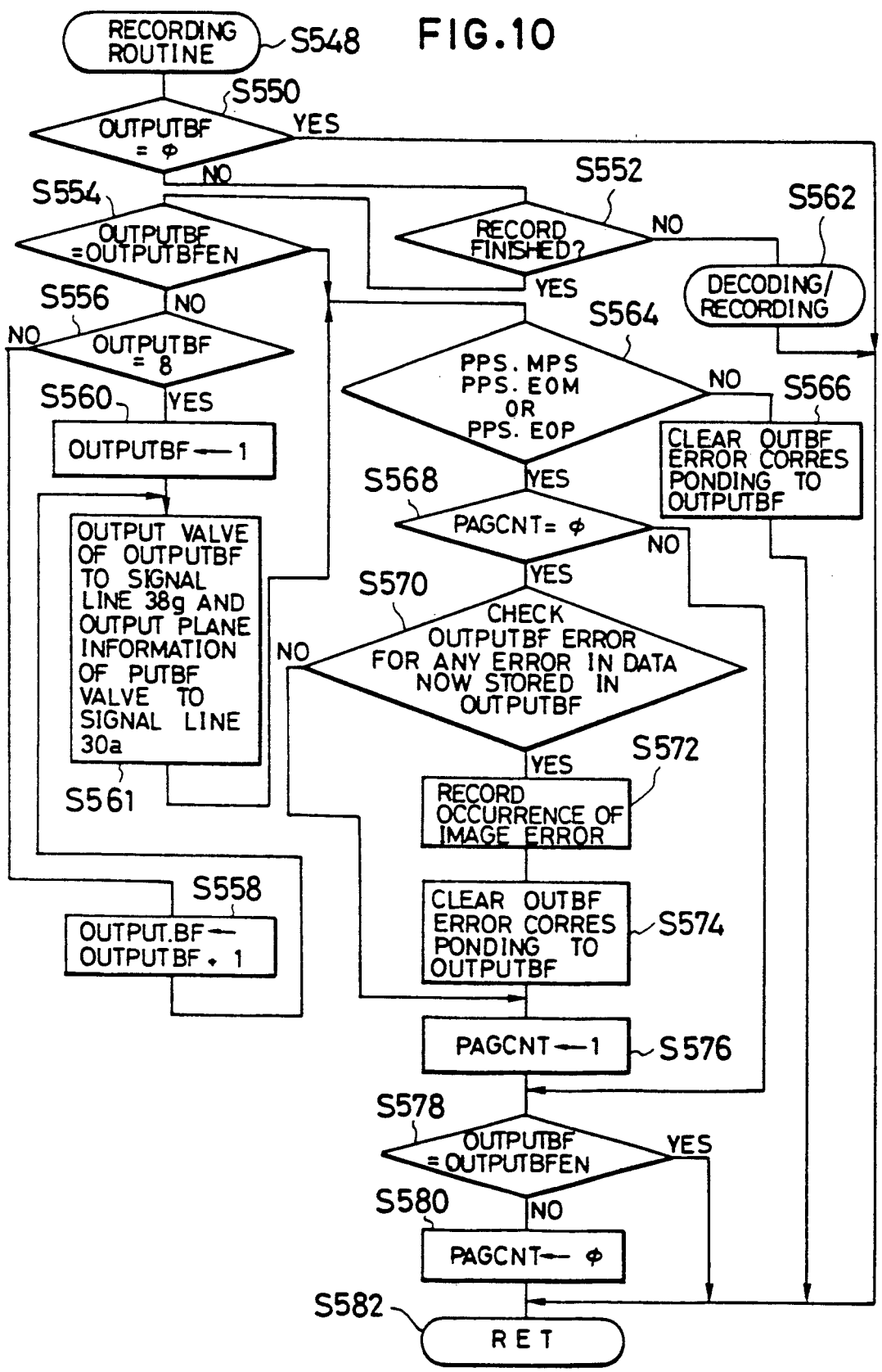
FIG. 10 is a flow chart illustrative of a first recording routine performed by the control circuit 240 of the third embodiment.

In a step S 490, a judgment is executed as to whether the receiving of the image signals has been finished, i.e., whether the RCP signal has been received. When the receiving of the image signals has been finished, i.e., if the RCP signal is detected, the process proceeds to a step S 494. Conversely, when the receiving of the image signal has not been finished, i.e., when the RCP signal has not been detected, the process proceeds to a step S 492 in which the image signals received by the image memory are recorded. The recording routine executed in the step S 492 is shown in FIG. 10.

As the proces proceeds from the step S 490 to the step S 494 after the completion of receiving the image signals, a judgment is executed as to whether an error is caused in the block which is being received. If any error frame exists, the process proceeds from a step S 494 to a step S 496 so that a retransmission command signal, practically a PPR signal, is transmitted. Conversely, if no error frame exists, the process proceeds from the step S 494 to a step S 520.

In the steps S 498, S 500, S 502 and S 504, a judgment is executed as to whether a high-speed signal has been received in a predetermined time or whether a process signal of 300 b/sec has been received. If a high-speed signal is detected within a predetermined time, the process proceeds from the step S 498 to the step S 488. However, if a error retransmission continuation signal, practically, a CTC signal, is received within a predetermined time, the process proceeds from the step S 500 to the step S 506 in which an error retransmission continuation confirmation signal, practically a CTR signal, is transmitted. The process then returns to the step S 488.

When a signal indicative of suspension of error retransmission of the block under transmission is received, the proces proceeds from a step S 502 to a step S 510 in which an error retransmission interruption confirmation signal (ERR signal) is transmitted. The process then proceeds to a step S 510. After elapse of a predetermined time, the process proceeds from a step S 504 to a step S 508 in which an error routine is executed. The process then returns to a step S 542.

On the other hand, when the process has advanced from the step S 510 to the step S 512, "1" is set in the flag EORREC because in this case the EOR signal (End Of Retransmission signal) has been detected. In a step S 514, a judgment is executed as to whether the information received in the preceding receiving operation is a NULL block, i.e., whether one of PP-NULL or EOR-NULL has been received. If the information received in the preceding receiving operation is a NULL block, the process proceeds from a step S 514 to a step S 538. If the received information is not a NULL block, the process proceeds from a step S 514 to a step S 516 in which information indicative of the presence of an error frame is set in all of the blocks included in the sent one physical page which contains the block with which the EOR signal has been received. More practically, "1" is set in the OUTBFERROR corresponding to the value in the INPUTBF subsequent to the value in the OUTPUTBFEN. Then, the process proceeds to a step S 518.

In the step S 518, "0" is set in the flag EORREC and then the process proceeds to a step S 535.

As stated before, when the judgment in the step S 494 has proved that no error frame exists, the process proceeds to the step S 520. In this case, whether the buffers of eight planes are full is checked in steps 522, 524, 526 and 528. If the buffers are full, the recording routine (step S 528) is called while a flow control (step S 524) is being conducted. As is the case of the step S 492, the recording routine is indicated by the flow shown in FIG. 10.

The process then proceeds to a step S 530, when the condition of OUPUTBF=0 is not met in the step S 522, or when the value in INPUTBF after one increment conducted in the step S 526 does not coincide with the value in the OUTPUTBF.

Since the memory space for the storage of the next information has become empty, in the step S 530, a receive completion signal, i.e., an MCF signal, is received.

In a step S 532, a judgment is executed as to whether the information received in the preceding receiving operation is a NULL block or not. If the received information is a NULL block, the process proceeds to a step S 538. However, if the information is not a NULL block, the process proceeds to a step S 534.

In the step S 534, a judgment is executed as to whether the state of the flag EORREC is "1". If the answer is YES, the process proceeds to a step S 516. However, if the state of the flag is "0", the process proceeds to a step S 538.

In the step S 538, a judgment is executed as to whether there is any subsequent information. If there is any subsequent information, the process proceeds to a step S 540. However, if there is no subsequent information, the process proceeds to a step S 542.

In the step S 540, judgment is executed as to whether there is any mode change. However, if there is no mode change, the process proceeds to a step S 482, whereas, if there is no mode change, the process proceeds to a step S 470.

When the judgment in the step S 538 has proved that there is no subsequent information, the process proceeds to the step S 542 as described before. In this step, the recording routine of FIG. 10 is executed as in the steps S 492 and S 528.

Then, steps S 544 and S 546 are executed to determine whether all the information stored in the memory has been recorded. The process then returns to the step S 442.

A description will be given of the recording routine shown in FIG. 10. This routine is commenced with a step S 550 in which a judgment is executed as to whether the system has not been set in the mode for allowing delivery of data from the image memory, i.e., whether the state of the OUTPUTBFEN is 0. If the state of the OUTPUTBFEN is 0, i.e., if the system has not been set for the delivery of data from the image memory, the process proceeds to the step S 582. However, if the state of OUTPUTBFEN is not 0, i.e., if the system has been set in the mode for allowing delivery of data from the image memory, the process proceeds to a step S 552.

The step S 552 determines whether the recording of the block under recording has been competed. Upon confirmation of completion of the recording of this block, the process proceeds to a step S 554. However, if the recording has not been finished, the process proceeds to a step S 562 in which decoding is conducted thereby allowing recording to be conducted.

In the step S 554, a judgment is executed as to whether the plane carrying the data under recording is the same as the plane carrying the recordable data, i.e., whether the recordable information exists in the image memory. The fact that the plane (OUTPUTBF) carrying data under recording is the same as the plane (OUTPUTBFEN) carrying the recordable data are the same means that the recordable plane information is not recorded in the record image. In this case, the process proceeds to a step S 564. However, if the plane carrying the data under recording is not identical to the plane carrying recordable data, i.e., when the image memory still carries recordable image information, the value of the OUTPUTBF is incremented by one in the steps S 556, 558 and 560 and, thereafter, the value of the OUTPUTBF is delivered to the signal line 38g. Then, the plane information as the value set in the OUTPUTBF is delivered to the signal line 30a (step S 561).

In a step S 564, judgment is executed as to whether the present pagination corresponds to the physical pagination of the sending side, by checking receipt of PPS-MPS, PPS-EOM or PPS-EOP. If the present pagination corresponds to a physical pagination executed at the sending side, the process proceeds from the step S 564 to a step S 568. Conversely, if the present pagination has not been caused by the physical pagination of the sending side, the process proceeds from the step S 564 to a step S 566. In the step S 566, "0" is set in the OUTBFERROR corresponding to the counter OUTPUTBF storing the value of the plane from which the block is being output.

In the step S 568, judgment is executed whether the state of a flag PAGCNT is "0". If the answer is YES, the process proceeds to a step S 570. However, if the state of this flag is "1", the process proceeds to a step S 578.

The step S 570 checks the OUTBFERROR to examine whether the data presently stored in the OUTPUTBF contains any error. If any error exists, a sign or message indicative of the presence of the image error is recorded in a step S 572, and the OUTBFERROR corresponding to OUTPUTBF is cleared (corresponds to step S 574). The recording of information representative of the presence of image error is executed by outputting a signal of "1" level to the signal line 38i, generating a pulse on the signal line 38h and, after the recording, signal of "0" level is delivered to the signal line 38i.

In the step S 576, "1" is set in the PAGCNT.

In a step S 578, a judgment is executed as to whether the OUTPUTBF is the same as the OUTPUTBFEN. If the OUTPUTBF is not the same as the OUTPUTBFEN, "0" is set in PAGCHT (step S 580). If they are the same, the process returns in a step S 582.

An embodiment which operated with a continuous rolled sheet of recording paper has been described. When the facsimile apparatus is of the cut-sheet type, however, it is necessary that additional processes are performed after the step S 562 in the flow shown in FIG. 9, as well as next to the branch number to the question posed in the step S 564. A flow for executing the control when the facsimile apparatus is of cut-sheet type is shown in FIG. 11.

Figure 11:
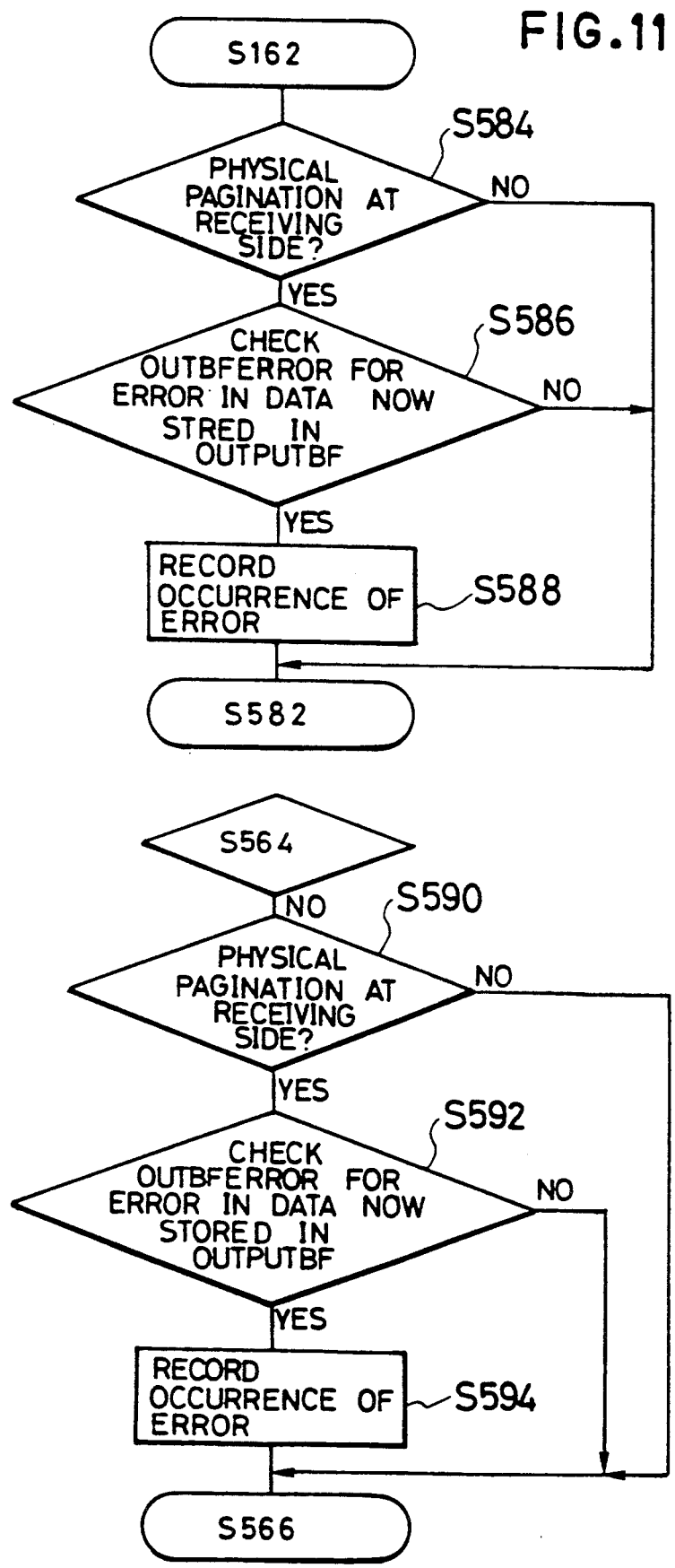
FIG. 11 is a flow chart illustrative of a second recording routine performed by the control circuit 240 of the third embodiment.

Referring to FIG. 11, in a step S 584, a judgment is executed as to whether the present pagination is caused by the physical pagination at the receiving side. If the present pagination is the physical pagination at the receiving side, the process proceeds to a step S 586. Conversely, if the present pagination is not the physical pagination at the receiving side, the process proceeds to a step S 582.

In the step S 586, the state of OUTBFERROR is checked and, at the same time, judgment is executed as to whether the data presently stored in the OUTPUTBF contains an error. If there is an error, a sign or message indicative of the presence of such an error is recorded in a step S 588. However, when there is no error, the process proceeds to a step S 582.

The step S 590 determines whether the present pagination is a physical pagination at the receiving side. If so, the process proceeds to a step S 592. However, if the present pagination is not the physical pagination of the receiving side, the process proceeds to a step S 566.

In the step S 592, the state of the OUTBFERROR is checked to determine whether there is any error in the data presently stored in the OUTPUTBF. If thee is any error, a sign or message indicative of the presence of such an error is recorded in a step S 594. If there is no error, the process proceeds to a step S 566.

As has will be understood from the foregoing description, when the facsimile apparatus of this embodiment operates in an error correction communication mode, a recording of a message, e.g., a message reading "PLEASE NOTE ERROR EXISTS" is recorded together with the recorded image in the event that any error frame which has not been corrected exists in the received data, so that the operator of the receiving side can be aware of the presence of such an error.

When this embodiment is applied to a facsimile apparatus of the type which records the received image data on successive cut sheets, the error message is recorded on all the sheets corresponding to the physical sent page which contains the error, so that the operator of the receiving side can correctly recognize the occurrence of the error in relation to the physical page of the sending side.

Although preferred embodiments have been described, it is to be understood that the described embodiments are illustrative and various changes and modifications may be imparted thereto.

It is also to be noted that the invention can be applied to a variety of types of apparatus which receive character code data and records the same, such as TELEXes, wordprocessors and so forth, although facsimile apparatus have been specifically mentioned.

What is claimed is:

1. A data communication system comprising:
   data receiving means for receiving data;
   data memory means for storing data received by said data receiving means;
   recording means for recording the data stored in said data memory means;
   acknowledgement signal generating means for transmitting an acknowledgement signal representative of safe receipt of one page of data when data of one page has been correctly received;
   information memory means for storing information representative of a recording condition of the data stored in said data memory means; and
   information output means for producing information indicative of the fact that there are non-recorded data in accordance with the information of said information memory means, wherein, in the case of power failure in recording data by said recording means, said information output means outputs information indicative of the existence of non-recorded data in accordance with the information of said information memory means.

2. A data communication system according to claim 1, further comprising retransmission demand signal generating means for checking the received data for any error and, when an error exists in the received data, transmitting a retransmission demand signal demanding retransmission of the data including the error.

3. A data communication system according to claim 2, wherein said acknowledgment signal generating means transmits said acknowledgment signal when no error exists in the received data of one page.

4. A data communication system according to claim 3, wherein said data memory means holds the received page data until all the data for the new page are correctly received.

5. A data communication system according to claim 4, wherein said received data of one page is the data of an imaginary page of a predetermined volume.

6. A data communication system comprising:
   data receiving means for receiving data;
   data memory means for storing data received by said data receiving means;
   recording means for recording data stored in said data memory means;
   acknowledgement signal generating means for transmitting an acknowledgement signal representative of safe receipt of one page of data when data of one page has been correctly received;
   information memory means for storing information representative of a recording condition of the data stored in said data memory means; and
   information output means for producing information indicative of the fact that there are non-recorded data in accordance with the information of said information memory means, wherein, in the case of power failure in recording data by said recording means, said information output means outputs information indicative of the existence of non-recorded data in accordance with a power-on after the power failure.

7. A data communication system comprising:
   first means for receiving signals of a high transmission speed; and second receiving means for receiving signals of a low transmission speed;

control means for switching said first and second receiving means to enable a selected one of said receiving means to receive signals;

wherein said control means determines whether a predetermined one of said high-speed signals has been detected continuously throughout a predetermined period and for effecting switching to said first receiving means when said predetermined high-speed signal has been detected continuously throughout said predetermined period, and, when said predetermined high-speed signal has not been detected continuously throughout said period, said control means enables said second receiving means to receive said low-speed signals for a time corresponding to a time required for the transmission of a predetermined unit of said high-speed signals.

8. A data communication system according to claim 7, wherein said control means judges whether a high-speed flag has been detected continuously throughout said predetermined period.

9. A data communication system according to claim 8, wherein if said high-speed flag has been detected continuously throughout said predetermined period, the control means enables said first means to receive signals of the high transmission speed and if said high-speed flag has not been detected continuously throughout said predetermined period, the control means switches to said second means for receiving signals of the low transmission speed.

10. A data communication system according to claim 7, wherein said first receiving means is capable of receiving high-speed signals of different transmission speeds.

11. A data communication system according to claim 7, further comprising transmission means for transmitting a low-speed signal.

12. A data communication system according to claim 7, wherein said high-speed signals include image signals, and said low-speed signals include a control signal.

13. A data communication system according to claim 12, further comprising:
transmission means for transmitting said control signal; and
error detection means capable of detecting error in the received image signals,
wherein, when an error exists in the received image signals, said control means enables said transmission means to transmit a signal demanding retransmission of the image signals in which said error has occurred.

14. A data communication system comprising:
first means for receiving signals of a high transmission speed;
second receiving means for receiving signals of a low transmission speed; and
control means for switching said first and second receiving means to enable a selected one of said receiving means to receive signals,
wherein said control means determines whether a predetermined one of said high-speed signals has been detected continuously throughout a predetermined period and for effecting switching to said first receiving means when said predetermined high-speed signal has been detected continuously throughout said predetermined period, and, when said predetermined high-speed signal has not been detected continuously throughout said period, said control means enables said second receiving means to receive said low-speed signals for a time corresponding to a time required for the transmission of a predetermined unit of said high-speed signals,
wherein said high-speed signals include image signals, and said low-speed signals include a control signal, and
wherein said control means executes an error routine so as to open a communication circuit both when no frame of image signals is detected in a period which is the sum of an image transmission time corresponding to the current transmission speed and a margin time, and when no effective frame of image signals is detected in a predetermined time from the detection of a previous effective frame of image signals.

15. A data communication system comprising:
receiving means for receiving data;
detection means for detecting whether an uncorrectable error frame of data exists in the received data;
recording means for recording the received data; and
control means responsive to the detection for enabling said recording means to record, when the presence of error has been detected by said detecting means, a message indicative of the presence of the error together with the recorded received data,
wherein the recording of the message indicative of the presence of the error is conducted on the basis of a physical page of a sending side,
wherein said data received is image data, and
wherein the received image data is image data of a long continuous original page of the sending side, and said recording means records the received image data on a plurality of cut sheets of a predetermined size, said message indicative of the presence of error being recorded on each of a plurality of cut sheets corresponding to one long continuous original of the sending side.

* * * * *

UNITED STATES PATENT AND TRADEMARK OFFICE
CERTIFICATE OF CORRECTION

PATENT NO. : 5,127,013
DATED : June 30, 1992
INVENTOR(S) : TAKEHIRO YOSHIDA

It is certified that error appears in the above-identified patent and that said Letters Patent is hereby corrected as shown below:

TITLE PAGE
IN [56] REFERENCES CITED

Under U.S. PATENT DOCUMENTS, "Abromson" should read --Abramson--.

SHEET 18 OF 18

FIG. 11, "S162" should read --S582--.

COLUMN 6

Line 55, "rear" should read --read--.

COLUMN 8

Line 67, "am" should read --an--.

COLUMN 9

Line 1, "step A94," should read --step S94,--.
    Line 11, "step S94," should read --step S96,--.
    Line 40, "108." should read --106.--.

COLUMN 12

Line 17, "line 1228a" should read --line 128a--.
    Line 54, "signal line 138" should read --signal line 136a--.

COLUMN 13

Line 20, "S179" should read --S166--.

UNITED STATES PATENT AND TRADEMARK OFFICE
CERTIFICATE OF CORRECTION

PATENT NO. : 5,127,013
DATED : June 30, 1992
INVENTOR(S) : TAKEHIRO YOSHIDA

It is certified that error appears in the above-identified patent and that said Letters Patent is hereby corrected as shown below:

COLUMN 16

Line 55, "is detected" should read --is not detected--.

COLUMN 17

Line 25, "DLS, STS" should read --DLP, STS--.

COLUMN 21

Line 19, "S48" should read --S448--.

COLUMN 23

Line 21, "step S535." should read --step S536.--.
Line 60, "no" should read --a--.

Signed and Sealed this

Twenty-third Day of November, 1993

Attest:

BRUCE LEHMAN

Attesting Officer                    Commissioner of Patents and Trademarks